(12) United States Patent
Hecht

(10) Patent No.: US 9,481,038 B2
(45) Date of Patent: Nov. 1, 2016

(54) CUTTING INSERT HAVING A DOVETAIL ANTI-SLIP ARRANGEMENT

(71) Applicant: Iscar, Ltd., Tefen (IL)

(72) Inventor: Gil Hecht, Nahariya (IL)

(73) Assignee: Iscar, Ltd., Tefen (IL)

( * ) Notice: Subject to any disclaimer, the term of this patent is extended or adjusted under 35 U.S.C. 154(b) by 342 days.

(21) Appl. No.: 14/177,021

(22) Filed: Feb. 10, 2014

(65) Prior Publication Data

US 2015/0158091 A1 Jun. 11, 2015

Related U.S. Application Data

(60) Provisional application No. 61/914,780, filed on Dec. 11, 2013.

(51) Int. Cl.

| | |
|---|---|
| *B23B 27/16* | (2006.01) |
| *B23C 5/10* | (2006.01) |
| *B23C 5/20* | (2006.01) |
| *B23C 5/22* | (2006.01) |

(52) U.S. Cl.
CPC .............. *B23B 27/16* (2013.01); *B23C 5/109* (2013.01); *B23C 5/207* (2013.01); *B23C 5/22* (2013.01); *B23C 2200/0477* (2013.01); *B23C 2200/125* (2013.01); *B23C 2200/128* (2013.01); *B23C 2200/161* (2013.01); *B23C 2210/16* (2013.01); *B23C 2210/165* (2013.01); *B23C 2210/168* (2013.01); *Y10T 407/1906* (2015.01); *Y10T 407/1934* (2015.01); *Y10T 407/23* (2015.01)

(58) Field of Classification Search
CPC ................ B23C 2200/0477; B23C 2200/161; B23C 5/22; B23C 2200/125; B23C 2200/128; B23C 2210/16; B23C 2210/165; B23C 2210/168; B23C 5/109; B23C 2200/162; B23C 2200/163; B23C 2200/167; B23C 5/2221; B23B 27/16

See application file for complete search history.

(56) References Cited

U.S. PATENT DOCUMENTS

| | | | | |
|---|---|---|---|---|
| 4,315,706 A | * | 2/1982 | Erkfritz | B23B 27/1611 407/101 |
| 4,335,983 A | | 6/1982 | Wermeister et al. | |
| 4,461,602 A | * | 7/1984 | Zettl | B23C 5/2213 407/40 |
| 4,667,713 A | * | 5/1987 | Wright | B23C 5/2265 144/231 |
| 5,139,371 A | * | 8/1992 | Kraft | B23B 27/164 407/101 |
| 5,542,795 A | * | 8/1996 | Mitchell | B23C 5/2221 407/35 |

(Continued)

FOREIGN PATENT DOCUMENTS

| | | | |
|---|---|---|---|
| DE | 3303209 A1 * | 8/1984 | B60R 22/36 |
| EP | 1 753 576 | 11/2007 | |

OTHER PUBLICATIONS

International Search Report dated Feb. 24, 2015 issued in PCT counterpart application (No. PCT/IL2014/050997).

*Primary Examiner* — Sara Addisu

(74) *Attorney, Agent, or Firm* — Womble Carlyle

(57) ABSTRACT

A cutting insert having a dovetail anti-slip arrangement for securing the cutting insert to a tool. The cutting insert's anti-slip arrangement includes first, second and third insert abutment surfaces having dovetail portions, each of which form an external and acute dovetail angle with an insert base surface. The dovetail portions are configured with one or more geometric features related to a cutting edge geometry of the cutting insert.

24 Claims, 7 Drawing Sheets

(56) References Cited

U.S. PATENT DOCUMENTS

| | | | | |
|---|---|---|---|---|
| 5,607,263 A * | 3/1997 | Nespeta | B23B 27/007 | 407/53 |
| 5,733,073 A * | 3/1998 | Zitzlaff | B23B 27/16 | 407/102 |
| 5,746,549 A * | 5/1998 | Kress | B23B 27/16 | 279/79 |
| 5,810,518 A * | 9/1998 | Wiman | B23B 27/065 | 407/102 |
| 5,944,456 A * | 8/1999 | Shirley | B23C 5/109 | 407/42 |
| 6,276,879 B1 * | 8/2001 | Hecht | B23B 31/008 | 279/93 |
| 6,595,305 B1 * | 7/2003 | Dunn | B23B 51/00 | 175/336 |
| 7,001,114 B2 * | 2/2006 | Blucher | B23B 27/007 | 407/103 |
| 7,112,021 B2 * | 9/2006 | Pantzar | B23B 31/11 | 279/8 |
| 7,121,771 B2 * | 10/2006 | Englund | B23B 27/1622 | 407/103 |
| 7,150,590 B2 * | 12/2006 | Schafer | B23B 27/007 | 407/40 |
| 7,153,066 B2 * | 12/2006 | Schafer | B23C 5/10 | 407/30 |
| 7,201,545 B2 * | 4/2007 | Ejderklint | B23B 27/1611 | 407/101 |
| 7,325,471 B2 * | 2/2008 | Massa | B23B 27/12 | 279/8 |
| 7,467,915 B2 * | 12/2008 | de Souza | B23B 51/00 | 408/144 |
| 7,476,061 B2 * | 1/2009 | Edler | B23B 27/1625 | 407/113 |
| 7,488,142 B2 * | 2/2009 | Englund | B23B 27/1622 | 407/103 |
| 7,530,769 B2 * | 5/2009 | Kress | B23B 27/1625 | 407/107 |
| 7,578,641 B2 * | 8/2009 | Andersson | B23C 5/2208 | 407/103 |
| 8,277,151 B2 * | 10/2012 | Wandeback | B23C 5/06 | 407/113 |
| 8,313,270 B2 * | 11/2012 | Hecht | B23C 5/109 | 407/113 |
| 8,821,079 B2 * | 9/2014 | Hecht | B23B 27/1622 | 407/113 |
| 8,858,130 B2 * | 10/2014 | Morrison | B23C 5/06 | 407/113 |
| 9,120,156 B2 * | 9/2015 | Hecht | B23B 27/145 | |
| 9,227,246 B2 * | 1/2016 | Morgulis | B23B 27/04 | |
| 9,409,241 B2 * | 8/2016 | Hecht | B23C 5/006 | |
| 2003/0072625 A1 * | 4/2003 | Morgulis | B23C 5/2221 | 407/35 |
| 2004/0025969 A1 * | 2/2004 | Lindsay | B23C 5/207 | 144/241 |
| 2005/0152754 A1 * | 7/2005 | Wiman | B23B 27/145 | 407/103 |
| 2012/0155978 A1 | 6/2012 | Osawa et al. | | |
| 2012/0201622 A1 * | 8/2012 | Kocherovsky | B23B 29/02 | 409/131 |
| 2013/0129432 A1 * | 5/2013 | Jaeger | B23C 5/207 | 407/42 |
| 2013/0251463 A1 * | 9/2013 | Harif | B23B 27/04 | 407/11 |
| 2013/0330136 A1 * | 12/2013 | Hecht | B23C 5/2221 | 407/113 |
| 2014/0169892 A1 | 6/2014 | Hecht | | |
| 2014/0234036 A1 * | 8/2014 | Atar | B23C 5/109 | 407/40 |
| 2015/0158090 A1 * | 6/2015 | Hecht | B23B 27/16 | 407/113 |

\* cited by examiner

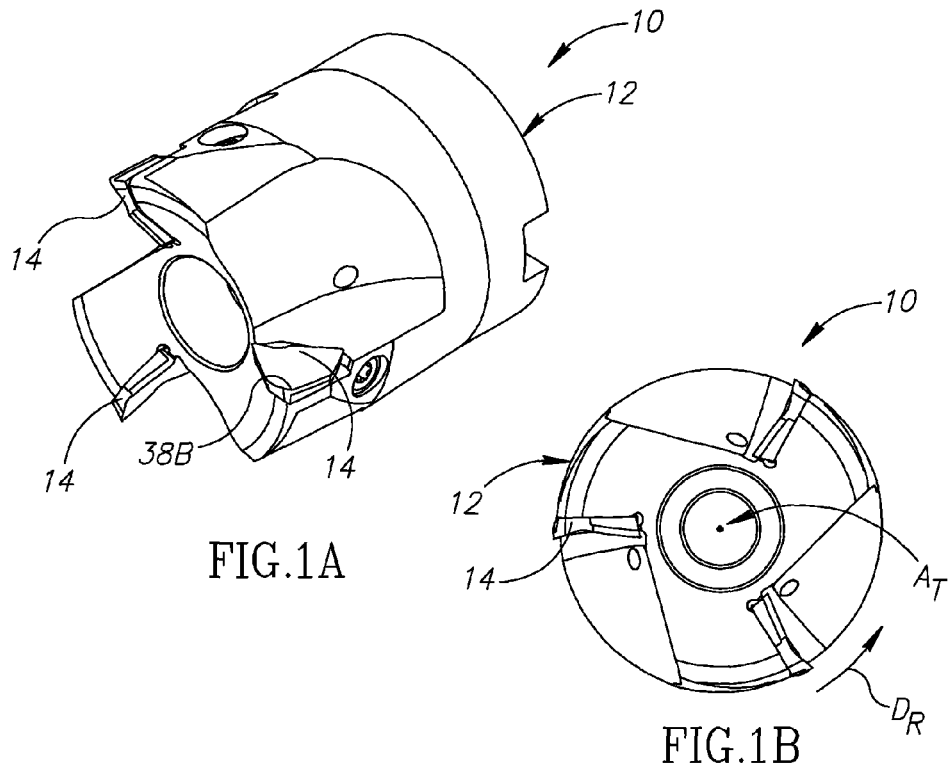
FIG.1A
FIG.1B
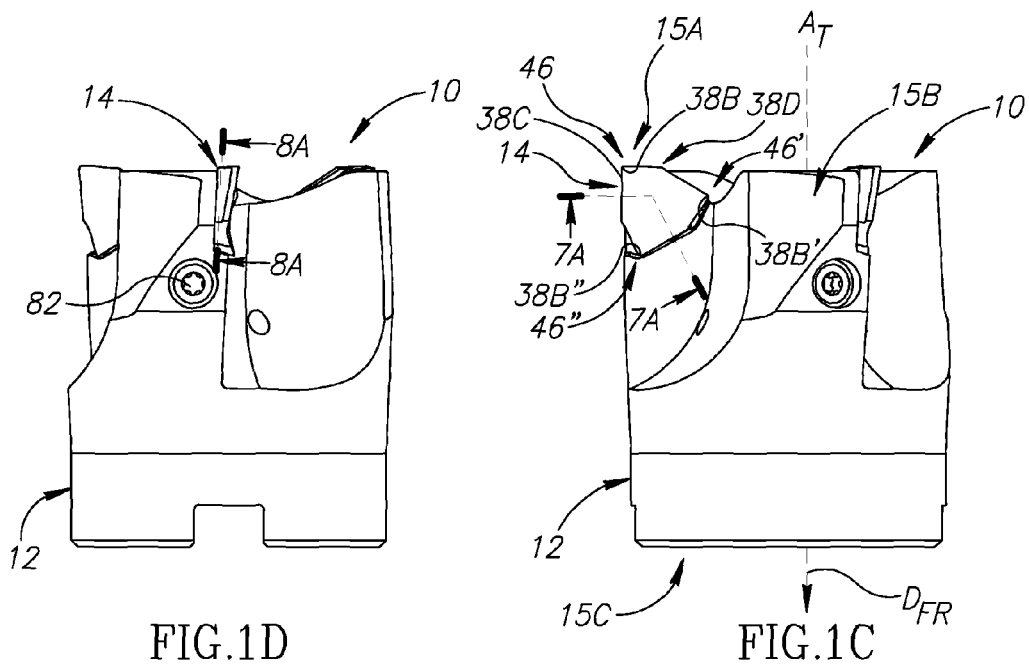
FIG.1D
FIG.1C

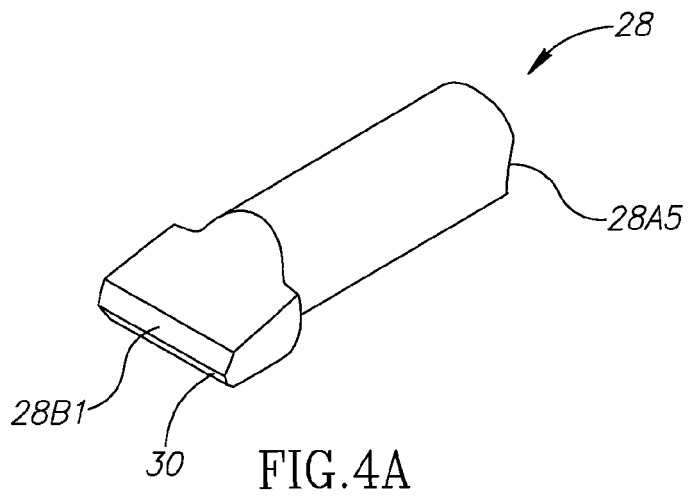
FIG.4A
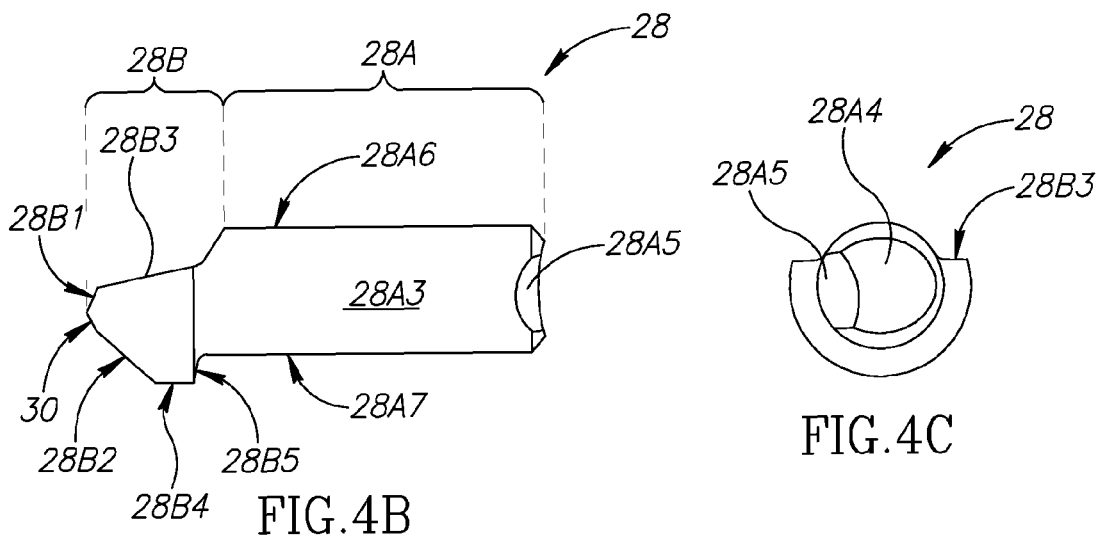
FIG.4B
FIG.4C
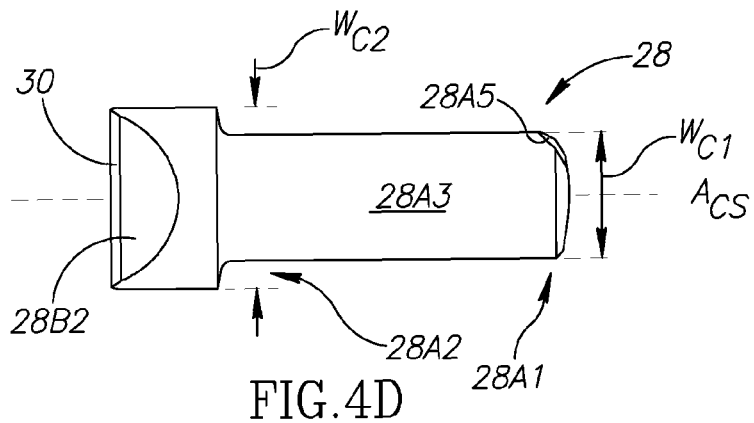
FIG.4D

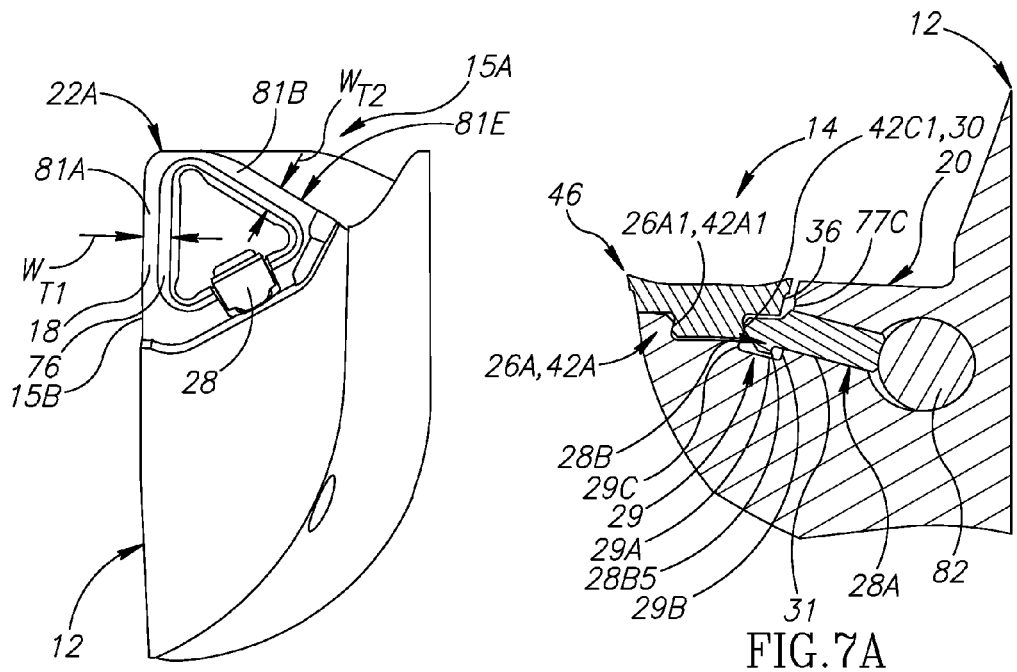
FIG.6
FIG.7A
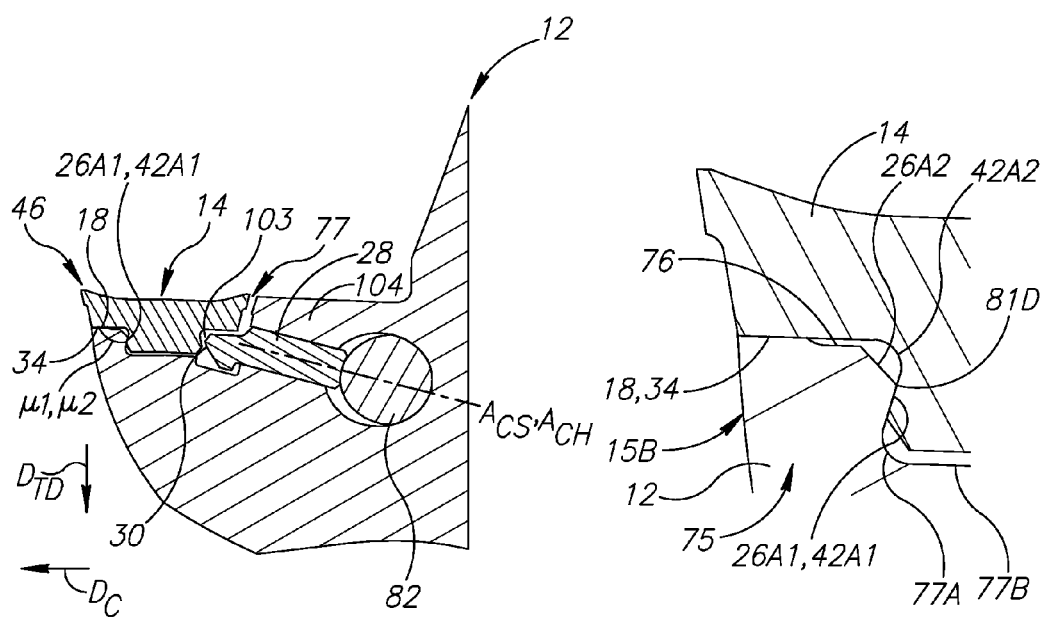
FIG.7B
FIG.7C

US 9,481,038 B2

CUTTING INSERT HAVING A DOVETAIL ANTI-SLIP ARRANGEMENT

RELATED APPLICATIONS

The present application claims priority to U.S. Provisional Patent Application No. 61/914,780, filed 2013 Dec. 11, the contents of which are incorporated by reference in their entirety. Subject matter disclosed in the present application is related to that disclosed in copending U.S. patent application Ser. No. 14/103,226, filed 2013 Dec. 11, the contents of which are incorporated by reference.

FIELD OF THE INVENTION

The subject matter of the present application relates to a cutting insert having a dovetail anti-slip arrangement for securing the cutting insert to a machine tool.

BACKGROUND OF THE INVENTION

Precise positioning of a cutting insert on a tool can allow for high precision machining. However, cutting inserts are often subjected to high forces during machining operations which can cause displacement or change of orientation of the cutting insert relative to a machine tool which holds it.

U.S. Pat. No. 4,335,983 discloses a cutting insert 5 with inclined side surfaces 22, 23, as seen in FIG. 6 of that reference. The cutting inserts 5 are clamped in place by a biasing force applied to another inclined side surface 25 thereof.

U.S. Pat. No. 5,746,549 discloses a cutting insert with a "snap-action locking means". The cutting insert has a protuberance ("projection 23") extending downwardly from an insert base surface, the protuberance having a "lock surface 27" engageable by a locking element or member 29. The tool can also comprise an ejection element 39 for applying an ejection force against the tension force applied by the locking element 29. Another publication showing a protuberance is EP 1 753 576.

SUMMARY OF THE INVENTION

In accordance with a first aspect of the subject matter of the present application, there is provided a cutting insert with an insert dovetail anti-slip arrangement adjacent to an insert base surface thereof.

In accordance with a further aspect of the subject matter of the present application, there is provided a cutting insert comprising opposing insert top and base surfaces which are connected by an insert peripheral surface, and an insert dovetail anti-slip arrangement adjacent to the insert base surface and comprising first, second and third insert abutment surfaces; the first insert abutment surface comprising a first dovetail portion forming an external and acute first dovetail angle with the insert base surface; the second insert abutment surface comprising a second dovetail portion forming an external and acute second dovetail angle with the insert base surface; the third insert abutment surface comprising a third dovetail portion forming an external and acute third dovetail angle with the insert base surface; in a view perpendicular to the insert base surface, the first dovetail portion is non-parallel with the second dovetail portion; and the cutting insert has a solid construction.

It is noted that all anti-slip arrangements (insert or tool) in the present application are so-called "dovetail" anti-slip arrangements, i.e. comprising non-parallel dovetail portions forming an acute dovetail angle with an associated base surface. For the sake of conciseness, the words "anti-slip arrangement" may appear hereinafter without the preceding word "dovetail" but should be construed as having the same meaning. Similarly, for conciseness, the words "anti-slip arrangement" may appear hereinafter without a preceding word "insert" or "tool" if the context clearly refers to an anti-slip arrangement of one or the other.

It is also noted that a view perpendicular to a base surface can also be a sectional view, and can alternatively be a view along an insert central axis extending perpendicular to, and through the center of, the insert base surface.

In accordance with still a further aspect of the subject matter of the present application, there is provided a cutting insert comprising: opposing insert top and base surfaces which are connected by an insert peripheral surface, a protuberance extending from and surrounded by the insert base surface and spaced apart from the insert peripheral surface, and a dovetail anti-slip arrangement formed on the protuberance; the dovetail anti-slip arrangement comprising first, second and third insert abutment surfaces respectively comprising first, second and third dovetail portions each respectively forming an external and acute dovetail angle with the insert base surface; at least the first and second dovetail portions being non-parallel to each other in a view perpendicular to the insert base surface.

In accordance with another aspect of the subject matter of the present application, there is provided a cutting insert comprising opposing insert top and base surfaces which are connected by an insert peripheral surface, and an insert dovetail anti-slip arrangement adjacent to the insert base surface and comprising at least three insert abutment surfaces; a first insert abutment surface comprising a first insert dovetail portion forming an external and acute first insert dovetail angle with the insert base surface; a second insert abutment surface comprising a second insert dovetail portion forming an external and acute second insert dovetail angle with the insert base surface; a third insert abutment surface comprising a third insert dovetail portion forming an external and acute third insert dovetail angle with the insert base surface; in a view perpendicular to the insert base surface, the third insert abutment surface faces in a direction opposite to a location where the first and second insert abutment surfaces converge.

In accordance with another aspect of the subject matter of the present application, there is provided a tool with a tool dovetail anti-slip arrangement adjacent to a tool base surface thereof.

In accordance with yet another aspect of the subject matter of the present application, there is provided a tool with first and second tool abutment surfaces, which, in a view perpendicular to a tool base surface, converge towards each other with increasing proximity to a tool peripheral region.

In accordance with a further aspect of the subject matter of the present application, there is provided a tool having a rotation axis defining a front-to-rear direction and comprising: a tool cutting end; a tool peripheral surface extending rearward from the tool cutting end; an insert seating region adjacent to the tool cutting end; and tool inner and peripheral regions located on opposing sides of the insert seating region; the tool peripheral region extending along the tool cutting end and/or the tool peripheral surface; the insert seating region comprising a tool base surface, a seating recess recessed into the tool from the tool base surface and at least partially surrounded thereby, and first and second tool abutment surfaces; the first tool abutment surface comprising a first tool dovetail portion forming an internal and acute first tool dovetail angle with the tool base surface; and the second tool abutment surface comprising a second tool dovetail portion forming an internal and acute second tool dovetail angle with the tool base surface; in a view perpendicular to the tool base surface, the first tool dovetail portion is non-parallel with the second tool dovetail portion; and the tool is further a clamp hole opening out at a first end to the seating recess and extending therefrom inside the tool.

In accordance with another aspect of the subject matter of the present application, there is provided a tool comprising a screw hole opening out to a tool peripheral surface and a clamp hole intersecting the screw hole and being directed towards a tool peripheral region.

In accordance with a further aspect of the subject matter of the present application, there is provided a tool comprising: a tool cutting end; a tool peripheral surface extending rearward from the tool cutting end; an insert seating region adjacent to the tool cutting end; tool inner and peripheral regions located on opposing sides of the insert seating region, the tool peripheral region extending along the tool cutting end and/or the tool peripheral surface; a screw hole opening out at a first end to the tool peripheral surface and extending into the tool inner region; a clamp hole opening out at a first end to the insert seating region and at a second end to the screw hole, and having a clamp hole axis extending through a center thereof and towards the tool peripheral region; the insert seating region comprising a tool base surface and first and second tool abutment surfaces, which, in a view perpendicular to the tool base surface, converge towards each other with increasing proximity to the tool peripheral region.

In accordance with still another aspect of the subject matter of the present application, there is provided a tool according to any of the aspects above, further comprising a clamp and a screw configured for moving the clamp.

In accordance with a further aspect of the subject matter of the present application, there is provided a tool comprising a tool, a screw and a clamp; the tool comprising a screw hole opening out at a first end to a tool peripheral surface and extending into the tool, and a clamp hole opening out at a first end to an insert seating region and at a second end to the screw hole; the screw being located in the screw hole; the clamp being located in the clamp hole; the screw comprising an actuator portion, an enlarged portion and a central portion being thinner than the enlarged portion and located between the actuator portion and the enlarged portion; the screw's actuator portion being closer than the enlarged portion to the tool peripheral surface; the clamp abutting the enlarged portion; the tool being configured to move the clamp towards the insert seating region via abutment thereof with the enlarged portion when the screw is moved in an outward direction from the tool.

As will be further detailed below, a dovetail anti-slip arrangement of a cutting insert can have surfaces configured for use with a tool having corresponding tool dovetail anti-slip arrangement surfaces.

In accordance with another aspect of the subject matter of the present application, there is provided a tool assembly comprising a tool according to any one of the aspects above and a cutting insert according to any one of the aspects above.

More specifically, the tool assembly can comprise a cutting insert according to any one of the aspects above; a tool according to any one of the aspects above; and a clamp positioned within a clamp hole; wherein the cutting insert is mounted to an insert seating region of the tool with only: a first insert abutment surface abutting a first tool abutment surface; a second insert abutment surface abutting a second tool abutment surface; a clamp abutting a third insert abutment surface; and an insert base surface abutting the tool base surface.

In accordance with yet another aspect of the subject matter of the present application, there is provided a method of clamping a cutting insert to a tool, each having a construction according to one of the aspects above.

One or more of the following advantages can be achieved with an insert dovetail anti-slip arrangement formed adjacent to an insert base surface:

Insert side surfaces can be independent of a clamping function. Stated differently, the insert side surfaces can be configured (sized and/or oriented) to be spaced from all surfaces of a tool. Stated differently yet, the insert side surfaces can be configured to be free of contact with a tool. Consequently, a single tool with a tool dovetail anti-slip arrangement (corresponding to a single-sized dovetail anti-slip arrangement) can be configured to hold different shaped and/or sized cutting inserts (i.e. the side surfaces of the inserts can have different sizes and/or shapes). By contradistinction the tool disclosed in U.S. Pat. No. 4,335,983 is more restricted to use an insert of a specific peripheral shape (since the surfaces of the tool configured to contact the dovetail side surfaces 22, 23, and even the rear side surface 25 of the cutting insert thereof are configured to contact the cutting insert at predetermined positions).

An insert top surface of the cutting insert can be independent of a clamping function (for example, the insert top surface can be devoid of a protruding screw head, an outwardly projecting portion adjacent to a screw hole, or a configuration designed to receive a clamping jaw. Consequently, chips can be allowed to freely flow along the insert top surface or can be designed to control flow thereof in an advantageous manner.

A cutting insert can have a solid construction (i.e. since the dovetail portions are configured to restrict upward movement of the cutting insert relative to a tool on which it is mounted; hence there is no requirement for a relatively large screw hole, or multiple small screw holes, for receiving a screw or screws configured for providing a downward force required to hold the cutting insert to a tool). Consequently, a cutting insert can be relatively much smaller (and consequently lighter) than known inserts for high-speed machining, which can be very significant due to the large forces associated with a cutting insert's weight when rotated at high speeds.

Three or more dovetail portions can allow a cutting insert to be indexable three or more times.

Dovetail portions which are adjacent to an insert base surface (and are not constituted by the insert base surface itself) can provide both clamping (i.e. in a direction perpendicular to an insert base surface) and lateral anti-slippage functions.

Similarly, a tool and/or tool assembly configured for holding a cutting insert with any of the features described above can achieve one or more similar advantages:

Tool pocket side surfaces can be independent of a clamping function. Stated differently, the tool pocket side surfaces can be configured (sized and/or oriented) to be spaced from all surfaces of a cutting insert to be held thereby. Stated differently yet, the tool pocket side surfaces can be configured to be free of contact with a cutting insert.

A tool can be configured to only contact a cutting insert via a tool base surface and surfaces located at a seating recess. The remainder of the tool can be independent of an additional construction having a clamping function (for example, a tool can be devoid of a screw configured to directly apply a clamping force on a cutting insert or a clamping jaw configured to directly apply a clamping force on a cutting insert).

A tool inner region, at a height above the tool base surface, can be independent of a clamping function (i.e. when the clamping arrangement is accessed via a screw hole opening out to a tool peripheral surface) Consequently, chips can be allowed to freely flow along the insert top surface and adjacent tool inner region.

A tool can be configured to further clamp an insert using centrifugal force (i.e. during rotation, and where the clamping arrangement is accessed via a screw hole opening out to a tool peripheral surface, and the screw is designed to clamp the insert when withdrawing the screw from the tool).

A tool can provide extra stability for clamping a cutting insert by providing a clamping force in a cutting direction.

A tool can prevent upward displacement of a cutting insert and/or clamp (where a portion of the clamp is at least partially covered from above by the tool (stated differently, the clamp is partially inside the tool).

Dovetail portions which are adjacent to a tool base surface (and are not constituted by the tool base surface itself) can provide both clamping (i.e., in a direction perpendicular to a tool base surface) and lateral anti-slippage functions.

While production of arrangements with dovetail portions are somewhat complex (compared with a relatively simple/cheap construction of a screw hole and screw), it is believed that at least one of the advantages above, or a combination thereof, can offset such a disadvantage.

Regarding advantages above related to a cutting insert having a solid construction, it is noted that such advantage can to some degree coexist with a relatively small through-hole in a cutting insert. To elaborate, a cutting insert with a solid construction and being devoid of any through-hole whatsoever is, in theory, structurally stronger than a cutting insert formed with a through-hole. Even though the dovetail anti-slip arrangement of the present application, in contra-distinction to the normal through-hole/screw clamping arrangement, provides a downward clamping force to the cutting insert via the dovetail portions thereof, it will be understood that a cutting insert can still have a solid construction and be provided with a small through-hole, for example for coating without overly weakening the structure thereof. Thus, while a cutting insert with a solid construction and being devoid of a through-hole is advantageous regarding the structural strength thereof, it will be understood that a solid insert with a relatively small through-hole can still be advantageous, for example for coating purposes. To avoid unnecessarily weakening the cutting insert, such through-hole should be as small as possible. Accordingly, for the purposes of the specification and claims, a cutting insert defined as having a "solid construction" can still include a through-hole having a diameter of less than 3 mm (or a non-circular hole having an equivalent volume). Stated differently, a cutting insert having a solid construction is devoid of a through hole having a diameter of 3 mm or greater (or a non-circular hole having an equivalent volume). Preferably, such through-hole should be 2 mm or smaller, or, most preferably, even 1 mm or smaller (or a non-circular hole having an equivalent volume). It will be understood that the most structurally strong embodiment of a cutting insert can further defined as being "devoid of a through-hole" which means that the cutting insert is devoid of a through-hole of any diameter. Despite the fact that most cutting inserts comprise through-holes to provide the downward clamping force required to withstand thousands or even millions of impacts against a workpiece (in particular in milling applications) it is believed that at least one of the advantages above, or a combination thereof, can offset such disadvantage.

Regarding advantages above related to high-speed machining, it is noted that high-speed tools can be defined as those which are configured for operation in which a friction lock is insufficient to withstand centrifugal forces during rotation. Further elaboration can be found in ISO 15641. Such tools may be particularly advantageous for machining materials such as soft metals, especially aluminium.

Regarding advantages mentioned above related to slippage of the cutting insert along the tool base surface, it is noted that such slippage can include rotational and/or translational motion. The slippage preferably prevented is visible slippage, i.e. there could be sufficient constructional tolerance of the tool and/or cutting insert to allow visible relative motion thereof, which could allow the clamp to suitably position the cutting insert. However, the slippage could also be non-visible slippage, i.e. extremely small, such that it is not visible without magnification, but which can occur during cutting operations.

It will be understood that since a dovetail anti-slip arrangement of the present application is configured not only to provide a clamping function perpendicular to a base surface, but also a lateral anti-slippage function, such slippage being caused, inter alia, by cutting forces on at least one cutting edge of the cutting insert, the anti-slip arrangement can be advantageously configured with geometric features related to the cutting insert's cutting edge geometry. Some non-limiting examples of such geometric features can be one or more of a dovetail portion length, orientation or position, or, for example the number of dovetail portions in relation to the number of cutting edge portions of a cutting edge. It will be understood that reference to advantageous force distribution below is particularly pertinent for high-speed machining operations.

While cutting inserts with symmetrically arranged dovetail portions can be considered disadvantageous when subjected to non-symmetric cutting forces it is believed that at least one of the advantages above, or a combination thereof, can offset such disadvantage.

It will be understood that the above-said is a summary, and that any of the aspects above may further comprise any of the features described hereinbelow. Specifically, the following features, either alone or in combination, may be applicable to any of the above aspects:

i. A cutting insert can comprise opposing insert top and base surfaces which are connected by an insert peripheral surface.

ii. A cutting edge can be formed along an intersection of an insert top surface and an insert peripheral surface. A cutting edge can extend along an entire intersection of an insert top surface and an insert peripheral surface.

iii. A cutting edge can comprise, in a view perpendicular to an insert base surface, corner edge portions connecting straight portions. More precisely, first and second cutting edge portions can extending from a corner edge portion can be straight in a view perpendicular to an insert base surface.

iv. A cutting insert can be a single-sided cutting insert. For example, a cutting insert can comprise a cutting edge only along an intersection of an insert top surface and an insert peripheral surface.

v. A cutting edge can comprise first and second cutting edge portions extending from different sides of a corner edge portion. A first cutting edge portion can be longer than a second cutting edge portion thereof. A first cutting edge portion can, in a view perpendicular to an insert base surface, form with a first insert dovetail portion an angle of 30° or less. It was found that as the first cutting edge portion and first dovetail portion approach a parallel configuration, better force distribution can be provided by the cutting insert. Accordingly, it is preferable that a first cutting edge portion and a first insert dovetail portion form an angle of 15° or less.

vi. A cutting edge can comprise one or more major cutting edge portions. A major cutting edge portion is a longest straight cutting edge of an insert (there can be a plurality of major cutting edge portions of equal length) in a view perpendicular to an insert base surface.

vii. A cutting insert can comprise an equal number of straight insert dovetail portions (i.e. the word "straight" excluding corner dovetail portions) and major cutting edge portions.

viii. A cutting insert can comprise at least one major cutting edge portions which is parallel with an adjacent straight insert dovetail portion. All major cutting edge portions can be parallel with adjacent straight insert dovetail portions.

ix. In a view perpendicular to an insert base surface, a cutting insert can have rotational symmetry about an angle equal to 360° divided by a number of major cutting edge portions, around an insert central axis extending perpendicular to, and through the center of, the insert base surface (e.g. in the example illustrated below the cutting insert has rotational symmetry of 120° about the insert central axis). A cutting insert can have rotational symmetry of only an angle equal to 360° divided by a number of major cutting edge portions.

x. A cutting insert can be indexable. Each indexed position can use of the same dovetail portions. A cutting insert can have a number of cutting edge portions which differs from a number of indexed positions thereof. For example a triangular shaped cutting insert configured with three indexed positions can have six cutting edge portions (e.g., a first minor cutting edge portion sharing a common first corner edge portion with a first major cutting edge portion which is longer than the first minor cutting edge portion, and a second minor cutting edge portion sharing a common second corner edge with a second major cutting edge portion which is longer than the second minor cutting edge portion, and a third minor cutting edge portion sharing a common third corner edge with a third major cutting edge portion which is longer than the third minor cutting edge portion). In such example, the cutting insert can be configured to machine in a first indexed position using the first minor and major cutting edge portions, in a second position using the second minor and major cutting edge portions, and in a third position using the third minor and major cutting edge portions. A symmetric anti-slip arrangement can be advantageous for configuring a cutting insert to be indexable three or more times.

xi. A cutting edge can comprise one or more helical shaped portions. Preferably major and minor cutting edge portions of the cutting edge are all helically shaped. This can be advantageous, for example, for high-speed machining of aluminium.

xii. A cutting insert can have, in a view perpendicular to an insert top surface, a triangular shape.

xiii. An insert top surface can be configured as a rake surface.

xiv. An insert peripheral surface can be configured as a relief surface.

xv. A base surface of a cutting insert and/or tool can be planar.

xvi. A tool anti-slip arrangement can comprise first and second tool abutment surfaces. A tool anti-slip arrangement can comprise exactly two abutment surfaces, namely the first and second tool abutment surfaces. A tool anti-slip arrangement can comprise an actuator surface. A tool anti-slip arrangement can comprise exactly one actuator surface.

xvii. An insert anti-slip arrangement can comprise exactly three abutment surfaces.

xviii. First and second abutment surfaces of a tool and/or cutting insert can be non-parallel to each other in a view perpendicular to a respective base surface. First and second abutment surfaces can partially or, preferably, along the entire length thereof, converge towards each other. Each pair of points of the first and second abutment surfaces which are closer to an actuator surface plane than another pair of points of the first and second abutment surfaces located further from the actuator surface plane, can have a predetermined distance of greater magnitude than the latter pair of points. Pairs of closest points of the first and second abutment surfaces can lie within respective common abutment surface planes which are parallel to the actuator surface plane, are a predetermined distance apart. At least one of the predetermined distances has a greater magnitude than another predetermined distance which is associated with a pair of points further spaced from the actuator surface plane. In a perpendicular view of a tool or insert base surface, first and second abutment surfaces can extend at an insert or tool abutment angle of less than 180° to each other. First and second abutment surfaces can extend at an acute insert or tool abutment angle to each other. More preferred is an insert or tool abutment angle of between 20° to 90°. Even more preferred is a range of about 50° to about 70°.

xix. An anti-slip arrangement of a cutting insert or tool can be adjacent to a base surface thereof. Insert abutment surfaces can extend from an insert base surface in a direction away from an insert top surface.

xx. An abutment surface of a cutting insert can comprise an insert dovetail portion forming an external and acute dovetail angle with an insert base surface.

xxi. An abutment surface, preferably each abutment surface, of a cutting insert can comprise a concave shaped connection portion connecting an insert dovetail portion thereof to an insert base surface. Each concave shaped connection portion can have a radius $R_C$ of at least 0.05 mm. Such radius can be beneficial for providing structural strength during high-speed cutting operations. An insert dovetail portion and concave shaped connection portion together can form a protuberance abutment recess on a protuberance extending from the insert base surface. Generally speaking, as dovetail portions are configured to withstand particular force applications thereon, it will be understood that even non-continuous dovetail portions which are, nonetheless, co-planar, are to be considered for the purposes of the specification and claims a single dovetail portion.

xxii. Dovetail portions of first and second abutment surfaces can extend in an upward-inward direction. Insert dovetail angles can form with a base surface an external angle of between 50° to 80°. It was found that insert dovetail angles of 70° to 80° can provide an advantageous force distribution.

xxiii. In a view perpendicular to an insert base surface, a dovetail portion, or all dovetail portions of a cutting insert, can face outwardly from the cutting insert. To elaborate, a dovetail portion or portions can be slanted with points thereon which are further from an insert base surface tending towards an adjacent portion of a peripheral base edge in a view perpendicular to an insert base surface. Conversely, in a sectional view, perpendicular to a tool base surface, each of the first and second tool abutment surfaces can face inwardly. Similarly, a tool actuator surface can face inwardly.

xxiv. A peripheral base edge can extend along an intersection of an insert base surface and an insert peripheral surface.

xxv. A maximum base width can be measurable between furthest adjacent points of any (i.e. all) of the insert dovetail portions of the cutting insert to a peripheral base edge.

xxvi. A minimum base width can be measurable between closest adjacent points of any (i.e. all) of the insert dovetail portions of the cutting insert and an adjacent portion of a peripheral base edge. The minimum base width can have a magnitude of at least 50% of a maximum base width.

xxvii. In a view perpendicular to the insert base surface, a first base width can be measurable between a first dovetail portion and an adjacent portion of a peripheral base edge. If the dovetail portion and the adjacent peripheral base edge are not parallel, the first base width is considered to be between closest points thereof. The first base width can have a magnitude of 60% to 90% of a maximum base width. Preferably, the first base width can have a magnitude between 70% to 80% of the maximum base width.

xxviii. In a view perpendicular to an insert base surface, an inscribed dovetail circle can be inscribed to insert dovetail portions of an anti-slip arrangement and can have a dovetail radius R1.

xxix. In a view perpendicular to an insert base surface, an inscribed edge circle can be inscribed to a peripheral base edge of the cutting insert and can have an edge radius R2.

xxx. A dovetail radius R1 can have a magnitude of between 40% to 70% of an edge radius R2. Preferably, the dovetail radius R1 has a magnitude of between 45% to 65% of the edge radius R2, and most preferably between 50% to 60%.

xxxi. First and/or second insert dovetail portion can be elongated. Additionally, a third insert dovetail portion, or all insert dovetail portions of the cutting insert, can be elongated. Preferably the elongation can be in a direction parallel with an insert base surface. Stated differently, a first dimension of a dovetail portion can be measureable in a direction perpendicular to an insert base plane and a relatively larger dimension (i.e., along the elongation of the dovetail) can be measurable in a direction parallel with the insert base surface.

xxxii. First and second insert dovetail portions can have an equal length in a view perpendicular to the insert base surface. In addition, a third insert dovetail portion, or all insert dovetail portions of the cutting insert, can have the same length as the first and second insert dovetail portions.

xxxiii. Each of the insert abutment surfaces and each of the insert dovetail angles can be identical.

xxxiv. In a view perpendicular to the insert base surface, a first insert dovetail portion can be straight and adjacent to a straight major cutting edge portion. The first insert dovetail portion can have a first insert dovetail length L1 which has a magnitude of 63% to 83% of a first cutting edge length L2 of the major cutting edge portion, or preferably 75% to 83% of the first cutting edge length.

xxxv. In a view perpendicular to the insert base surface, all insert dovetail portions of the cutting insert can be straight and can be connected by insert dovetail corners. The straight insert dovetail portions and insert dovetail corners can form a continuous shape. The continuous shape can be a triangular.

xxxvi. Insert dovetail corners can form an external and acute corner insert dovetail angle with an insert base surface.

xxxvii. For strength considerations, it is preferred that, in a view perpendicular to an insert base surface, the insert base surface completely surround the anti-slip arrangement. Stated differently, an insert base surface can extend along (i.e., be adjacent to) an entire insert peripheral surface. First, second and third insert abutment surfaces can be spaced apart from an intersection of an insert peripheral surface and an insert base surface.

xxxviii. An insert dovetail plane $P_{ID}$ can be perpendicular to an insert base surface and extend between a center of first and second dovetail portions. The first and second dovetail portions can be symmetric about the insert dovetail plane $P_{ID}$. All dovetail portions of the cutting insert can be symmetric about the insert dovetail plane $P_{ID}$.

xxxix. An insert abutment surface, or at least a portion thereof, can constitute (i.e. function as) an insert actuator surface. An insert dovetail portion, or at least a portion thereof, can constitute an insert actuator surface.

xl. Insert abutment surfaces of a cutting insert can be configured such that, when in a clamped position, exactly two of at least three abutment surfaces thereof mate with tool abutment surfaces and another of the at least three abutment surfaces mates with an actuator surface of a clamp.

xli. A tool actuator surface and an insert actuator surface can both be planar.

xlii. In a view perpendicular to an insert base surface, a third insert abutment surface can faces in a direction opposite to a location where first and second insert abutment surfaces converge.

xliii. A cutting insert can be free of an insert actuator surface having extending perpendicular to an insert base surface. A cutting insert can be free of an insert actuator surface interposing one or more insert dovetail portions.

xliv. A cutting insert can comprise one or more protuberances projecting from an insert base surface, and some or preferably all of abutment surfaces belonging to an insert anti-slip arrangement can be formed on the one or more protuberances. Preferably, a cutting insert can comprise a single protuberance. It will be understood that a single protuberance can be structurally stronger than a plurality of protuberances comprising an anti-slip arrangement.

xlv. In a view perpendicular to an insert base surface, an anti-slip arrangement or protuberance comprising same can have a symmetric shape (i.e. triangular, circular, square, hexagonal etc.).

xlvi. A cutting insert can have a weight of between 2 to 6 grams. By providing dovetail portions, size and consequently weight, of a cutting insert can be reduced (in theory due to the stronger structure of a cutting insert without, for example, a relatively large through hole). This can be advantageous in high-speed operations with associated large forces. It will be understood that there is, nonetheless, a need for a certain minimum amount of material required to successfully carry out machining operations. Accordingly, it was found that a preferred size of cutting insert can have a weight of between 2.5 to 4.5 grams, with a most preferred design weight being between 3.2 to 4.2 grams.

xlvii. A cutting insert can comprise a cutting portion height measured perpendicular to an insert base surface and between the insert base surface and an uppermost point on the insert top surface most distal therefrom.

xlviii. A center of gravity of a cutting insert can be located between 12% to 30% of the cutting portion height from the insert base surface. It will be understood that a relatively low center of gravity can assist in stabilizing a cutting insert, particularly during high-speed operations. The center of gravity, for a cutting insert of the present application, can preferably be located between 21% to 29% of the cutting portion height from the insert base surface.

xlix. An anti-slip arrangement height can be measured parallel with the cutting portion height and from the insert base surface in a direction away from the insert top surface to a most distal lowermost point of the cutting insert. The cutting portion height can have a magnitude greater than that of the anti-slip arrangement height.

l. A dovetail height is measureable perpendicular to the insert base surface and from the insert base surface to a most distal point of dovetail portions of the cutting insert. A dovetail height can have a magnitude less than 70% of a cutting portion height. Even more preferably, the dovetail height should have a magnitude less than 50% of a cutting portion height. However, it is preferred that a dovetail height magnitude is greater than 30% of the cutting portion height.

li. A cutting insert can have a solid construction. The cutting insert can be devoid of a through-hole.

lii. A tool can comprise a central axis defining a front-to-rear direction. The central axis can be a rotation axis.

liii. A tool can comprise a cutting end.

liv. A tool can comprise a tool peripheral surface. The tool peripheral surface can extend circumferentially. The tool peripheral surface can extend rearward from the tool cutting end.

lv. A tool peripheral region can extend along a cutting end and/or a tool peripheral surface.

lvi. A tool can comprise a screw hole opening out at a first end to a tool peripheral surface and extending into a tool inner region.

lvii. A tool can comprise a clamp.

lviii. A tool can be formed with a clamp hole. The clamp hole can open out at a first end to an insert seating region. The clamp hole can open out at a second end to a screw hole. More precisely, the clamp hole's first end can open out to a seating recess. The clamp hole can be formed in a tool inner region. A clamp hole axis can extend through a center of the clamp hole towards the tool peripheral region. A clamp hole axis can extend to a location where first and second tool abutment surfaces converge.

lix. A tool can comprise an insert seating region. An insert seating region can be adjacent to a tool cutting end. An insert seating region can comprise a tool base surface. An insert seating region can comprise a seating recess. The insert seating region can comprise first and second tool abutment surfaces. More precisely, the first and second tool abutment surfaces can be located in the seating recess.

lx. First and second tool abutment surfaces, in a view perpendicular to the tool base surface, can converge towards each other with increasing proximity to a tool peripheral region.

lxi. A tool abutment surface can comprise a tool dovetail portion forming an internal and acute tool dovetail angle with a tool base surface.

lxii. In a view perpendicular to a tool base surface, a first tool dovetail portion can be non-parallel with a second tool dovetail portion.

lxiii. In a view perpendicular to a tool base surface, first and second tool abutment surfaces and a tool actuator surface can be in a triangular configuration.

lxiv. A tool can comprise tool inner and peripheral regions located on opposing sides of an insert seating region.

lxv. A tool can have a cutting direction. The cutting direction can be defined as extending from a tool inner region towards a tool peripheral region.

lxvi. A seating recess can be recessed into a tool from a tool base surface and at least partially surrounded thereby.

lxvii. A tool can be formed with a clamp hole opening out at a first end to a seating recess and extending therefrom inside the tool.

lxviii. A tool can comprise a clamp.

lxix. A clamp can be located at a tool inner region. A clamp can be formed with a tool actuator surface. A clamp can be configured for force application via the tool actuator surface in a cutting direction and/or a location where first and second tool abutment surfaces converge. Biasing of a tool actuator surface can comprise moving the clamp in a plane transverse to a tool base surface. More precisely, a clamp can be moved in an upward-outward direction (outward being towards a tool cutting end and/or tool peripheral surface).

lxx. A tool assembly can be configured such that an insert base surface contacts a tool base surface and a clamp of the tool is configured to bias a tool actuator surface against an insert third abutment surface. Such biasing can consequently bias first and second insert abutment surfaces against first and second tool abutment surfaces, or, more precisely, can bias first and second insert dovetail portions against first and second tool dovetail portions. This arrangement is configured to prevent slippage of the cutting insert along the tool base surface and also to apply a clamping force on the insert base surface against the tool base surface.

lxxi. A tool can comprise only a single tool actuator surface.

lxxii. A clamp can be pin-shaped. More precisely, a clamp can have a clamp shank portion and a clamp head portion.

lxxiii. A clamp head portion can be wider than the clamp shank portion in a direction perpendicular to a longitudinal clamp axis of the clamp shank portion.

lxxiv. A tool actuator surface can be formed at an end of a clamp head portion which is distal to a clamp shank portion. A tool actuator surface can be located between first and second clamp relief surfaces which form an internal acute clamp angle with each other. A tool actuator surface can be non-parallel and non-perpendicular to a clamp axis. A tool actuator surface, when the pin is mounted in a tool, can face in a direction away from a direction which the tool base surface faces. More precisely, the tool actuator surface can be slanted relative to the tool base surface and partially downwardly facing.

lxxv. An insert downward direction $D_{ID}$ can be defined as a direction opposite to a direction which an insert base surface faces. A tool downward direction $D_{TD}$ can be defined as a direction opposite to a direction which a tool base surface faces. When a cutting insert is clamped to a tool, an insert downward direction $D_{ID}$ can be identical to a tool downward direction $D_{TD}$.

lxxvi. A clamp shank portion can be cylindrical. A clamp shank portion's end can comprise a recess. The recess can be a concavely shaped recess. The recess can be, in an end view of the clamp shank portion, asymmetrically formed.

lxxvii. First and second tool abutment surfaces and the tool actuator surface can be recessed within an insert seating region. More precisely, the first and second tool abutment surfaces can be formed in a seat recess of the seating region. The first and second tool abutment surfaces can be proximate to a tool peripheral surface and/or tool cutting end. Preferably, the first and second tool abutment surfaces can be proximate to an intersection of the tool peripheral surface and tool cutting end.

lxxviii. A tool can be devoid of a screw-fastening arrangement configured to directly clamp a cutting insert to the tool. Similarly, a tool assembly can be devoid of a screw contacting a cutting insert.

lxxix. A tool can comprise a screw located in the screw hole and a clamp located in the clamp hole.

lxxx. A screw can comprise a first screw end, a second screw end and a central portion extending therebetween.

lxxxi. A first screw end can be formed with a tool receiving arrangement. The tool receiving arrangement can be located in a screw recess.

lxxxii. The screw second end ("enlarged portion") can be adjacent to and larger than the central portion.

lxxxiii. The central portion can be cylindrical.

lxxxiv. A tool can be configured such that a clamp can be positioned to be moved towards a cutting insert by an enlarged portion of a screw when the screw is moved in an outward direction from a tool.

lxxxv. A tool actuator surface and first and second tool abutment surfaces can be portions of a single continuous shape. For example, when the tool actuator surface is brought to a clamping position, the shape can be triangular.

lxxxvi. A tool base surface can extend continuously, except for a portion completed by a clamp. A tool base surface can extend along an entire boundary of a seating recess except for a portion completed by a clamp. A tool can comprise a single continuous wall including the first abutment surface and the second abutment surface.

lxxxvii. A first tool base width of the first tool abutment surface is the largest width measurable parallel to a tool base surface and perpendicular to an elongation direction of the first tool abutment surface. A second tool base width of the second tool abutment surface is the largest width measurable parallel to a tool base surface and perpendicular to an elongation direction of the second tool abutment surface. Notably, the first tool abutment surface can be the tool abutment surface closer to a tool peripheral surface than a tool cutting end, and the second tool abutment surface can be the tool abutment surface closer to a tool cutting end than a tool peripheral surface. The first tool base width can have a magnitude greater than the second tool base width. This can be beneficial in terms of force distribution during a machining operation, and most particularly during rotation of a tool.

lxxxviii. A tool anti-slip arrangement and an insert anti-slip arrangement can be configured to prevent motion of the cutting insert in a plane parallel with the tool base surface and also in a direction perpendicular thereto. Stated differently, dovetail portions of the anti-slip arrangements can constitute a biasing arrangement configured to bias the insert base surface against the tool base surface.

lxxxix. A biasing arrangement can be configured to allow slippage of the cutting insert along the tool base surface. The slippage allowed can be visible slippage. More precisely, a tool base surface can be sufficiently sized to allow a cutting insert to be seated and moved thereon in a cutting direction and in an opposite direction thereto. Clamping of a cutting insert to a tool can comprise sliding motion of a cutting insert's insert base surface along a tool base surface.

xc. A tool assembly can be configured so that the only contacting surfaces of tool thereof which contact a periphery of a cutting insert thereof are a tool actuator surface and first and second tool abutment surfaces.

xci. A tool assembly can be configured so that in a clamped position the only contacting surfaces of a cutting insert and a tool are the tool actuator surface, tool and insert abutment surfaces and tool and insert base surfaces. Stated differently the cutting insert and/or tool are configured so that they contact each other at exactly four surfaces.

xcii. First and second tool abutment surfaces can be integrally formed with the tool.

xciii. First and second insert abutment surfaces can be integrally formed with the cutting insert.

xciv. A method can comprise mounting a cutting insert on a tool in a position in which an insert base surface contacts a tool base surface, and biasing a clamp's tool actuator surface against a third insert abutment surface to thereby force non-parallel first and second insert abutment surfaces respectively against non-parallel first and second tool abutment surfaces.

xcv. A method can comprise: a tool comprising: an insert seating region comprising a tool base surface; tool inner and peripheral regions located on opposing sides of the insert seating region; and, a tool anti-slip arrangement; the tool anti-slip arrangement comprising first and second tool abutment surfaces formed adjacent to the tool base surface and being non-parallel to each other and to the tool base surface, and a clamp located at the tool inner region and comprising a tool actuator surface which is oriented perpendicular to the tool base surface; the cutting insert comprising opposing insert top and base surfaces which are connected by an insert peripheral surface, a cutting edge, and an insert anti-slip arrangement formed adjacent to the insert base surface; the insert anti-slip arrangement comprising first, second and third insert abutment surfaces which are non-parallel to each other and to the insert base surface and each comprise dovetail portions; wherein the method comprises: mounting the cutting insert on the tool in a position in which the insert base surface contacts the tool base surface; and biasing the clamp's tool actuator surface against the third insert abutment surface, thereby biasing dovetail portions of the first and second insert abutment surfaces respectively against dovetail portions of the first and second tool abutment surfaces for both preventing slippage of the cutting insert along the tool base surface and providing a clamping force therebetween.

BRIEF DESCRIPTION OF THE DRAWINGS

For a better understanding of the subject matter of the present application, and to show how the same may be carried out in practice, reference will now be made to the accompanying drawings, in which:

FIG. 1A is a perspective view of a tool assembly;

FIG. 1B is an end view of the tool assembly in FIG. 1A;

FIG. 1C is a side view of the tool assembly in FIG. 1A and 1B, and is also a view perpendicular to an insert top surface of the cutting insert designated as 14 in this figure;

FIG. 1D is another side view of the tool assembly in FIGS. 1A to 1C, rotated from the view in FIG. 1C to show a view perpendicular to an insert peripheral surface of the cutting insert designated as 14 in this figure;

FIG. 4A is a top perspective view of a clamp of the tool assembly in FIGS. 1A to 1E;

FIG. 4B is a side view of the clamp in FIG. 4A;

FIG. 4C is a rear end view of the clamp in FIGS. 4A and 4B;

FIG. 4D is a bottom view of the clamp in FIGS. 4A to 4C;

FIG. 6 is a top view of a tool and clamp of the tool assembly in FIGS. 1A to 1E;

FIG. 7A is a sectional view taken along line 7A-7A in FIG. 1C, with the cutting insert clamped to the tool;

FIG. 7B is a similar sectional view as in FIG. 7A, with the clamp being spaced apart from the cutting insert;

FIG. 7C is an enlarged view of a portion of FIG. 7B;

It is also noted that FIGS. 2 and 6 are views perpendicular to a tool base surface, FIGS. 1C and 8A and 8B are views perpendicular to the tool base surface and an insert base surface, and FIG. 3C is a view perpendicular to the insert base surface.

DETAILED DESCRIPTION

Referring to FIGS. 1A to 1E, which illustrate an example tool assembly 10 comprising a tool 12, in the form of a milling tool-head, and at least one cutting insert 14 clamped thereto.

The tool assembly 10, in this non-limiting example, is configured to mill a workpiece (not shown) by rotating about a tool central axis $A_T$ in a rotation direction $D_R$ (FIG. 1B). The tool central axis $A_T$ also defines a front-to-rear direction $D_{FR}$ (FIG. 1C).

The tool 12 can comprise a tool cutting end 15A located at one end of the tool 12 and a circumferential tool peripheral surface 15B extending rearward from the tool cutting end 15A to a tool shank end 15C.

Figure 2:
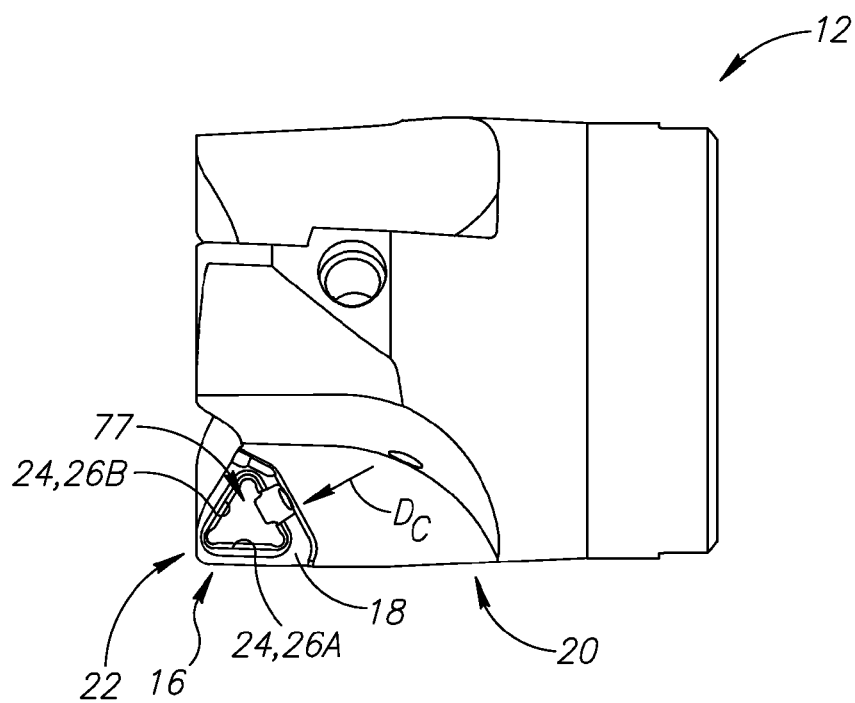
FIG. 2 is a top view of a tool base surface of a tool of the tool assembly in FIGS. 1A to 1E.

Referring also to FIG. 2, the tool 12 can comprise an insert seating region 16 comprising a planar tool base surface 18, tool inner and peripheral regions 20, 22 located on opposing sides of the insert seating region 16, and a tool anti-slip arrangement 24.

More precisely, the tool anti-slip arrangement 24 can comprise first and second tool abutment surfaces 26A, 26B formed adjacent to the tool base surface 18, and a tool actuator surface 30 (FIGS. 4A, 4B) formed on a clamp 28.

The clamp 28 can be located at the tool inner region 20. More precisely, the clamp 28 can extend from the insert seating region 16 into the tool 12 at the tool inner region 20.

Figure 3A:
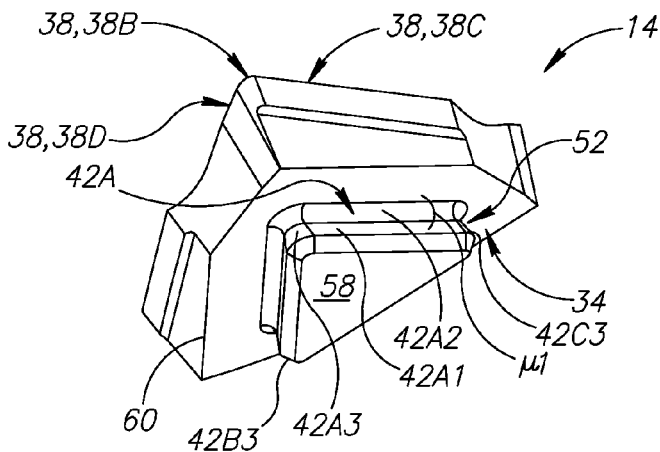
FIG. 3A is a bottom perspective view of the cutting insert of the tool assembly in FIGS. 1A to 1E.
Figure 3B:
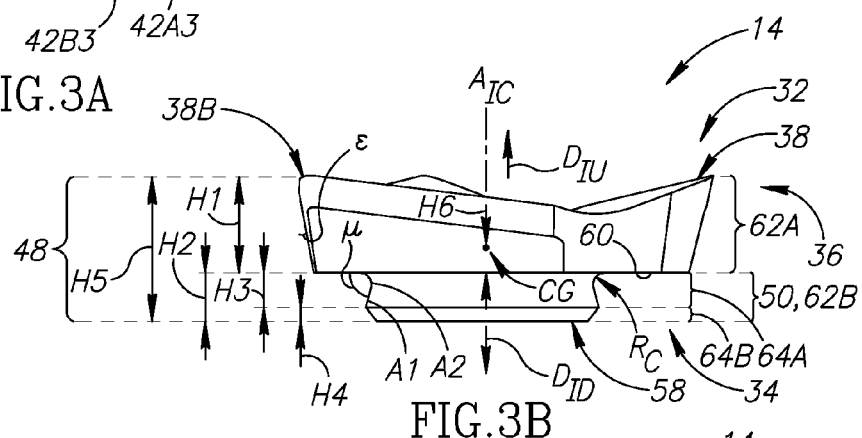
FIG. 3B is a side view of the cutting insert in FIG. 3A (noting that an identical view would be shown for each 120° rotation of the cutting insert about a central insert axis $A_{IC}$)
Figure 3C:
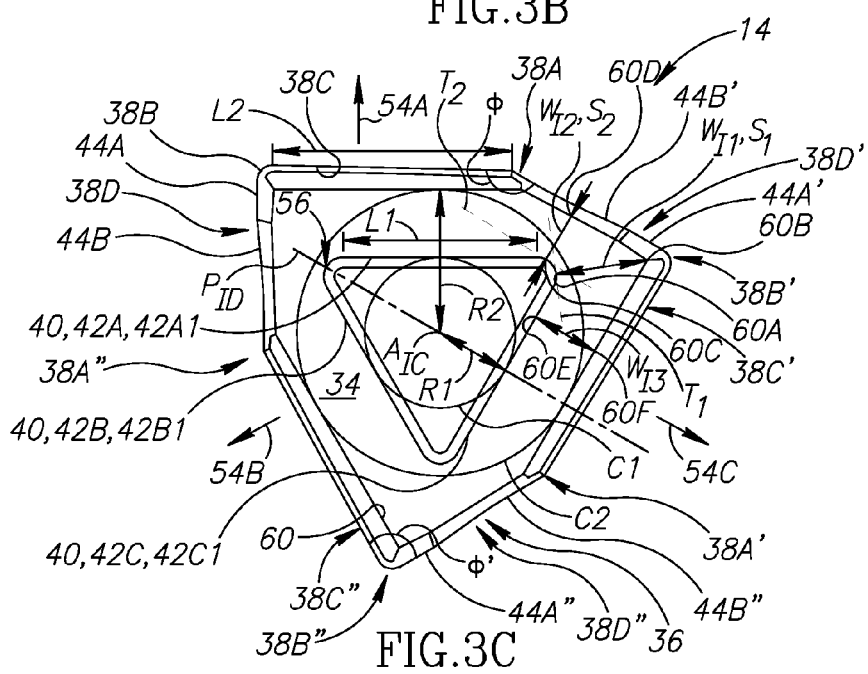
FIG. 3C is a bottom view of the cutting insert in FIGS. 3A and 3B.

Referring also to FIGS. 3A to 3C, the cutting insert 14 has a solid construction and in this example is devoid of a through-hole.

The cutting insert 14 can comprise opposing insert top and base surfaces 32, 34 (FIG. 3C) connected by an insert peripheral surface 36. A cutting edge 38 is formed along an intersection of the insert top surface 32 and the insert peripheral surface 36.

An insert dovetail anti-slip arrangement 40 (FIG. 3C) is formed adjacent to the insert base surface 34. More precisely, the insert anti-slip arrangement 40 can extend from the insert base surface 34 in a direction away from the insert top surface 32 (generally speaking, in an insert downward direction $D_{ID}$, which is shown in FIG. 3B).

The insert top surface 32 is configured as a rake surface and can be, as shown, devoid of projections, which can allow machined chips (not show) to pass freely thereover.

As shown in FIG. 1C, the cutting insert 14, and more particularly a top view of the insert top surface 32, can have a triangular shape (which, for the purposes of the specification and claims, includes the common "trigon" shaped insert, which is slightly modified from a conventional triangle shape to produce better surface finish) and can also be recessed towards the center thereof.

Referring to FIG. 3C, the insert base surface 34 can have a triangular shape and can extend along a plane (i.e. can be planar).

The present example shows a trigon shape which accordingly comprises first, second and third minor corner edge portions 38A, 38A', 38A'' between first, second and third major corner edge portions 38B, 38B', 38B''. The minor corner edge portions 38A, 38A', 38A'' each forming internal obtuse angles φ and the major corner edge portions 38B, 38B', 38B'' each forming internal acute angles φ'.

The insert peripheral surface 36 can be configured as a relief surface. The insert peripheral surface 36 can extend in an inward-downward direction forming an acute relief angle ξ (FIG. 3B).

Referring to FIGS. 3A to 3C, the cutting edge 38, in this example, extends along the entire intersection of the insert top surface 32 and the insert peripheral surface 36. Using the first major corner edge portion 38B as an example of each corner of the cutting insert 14, it is noted that the first major corner edge portion 38B can be connected at one side to a first major cutting edge portion 38C and at another side to a first minor cutting edge portion 38D.

The first minor cutting edge portion 38D can be advantageously shorter in length than the first major cutting edge portion 38C (the first minor cutting edge portion 38D being configured for ramping which typically constitutes a smaller percentage of overall machining time).

The second and third corner edge portion 38B', 38B'' can be similarly connected to major and minor cutting edge portions 38C', 38C'', 38D, 38D''. Each of the cutting edge portions can be identical to the others.

Each minor cutting edge portion 38D, 38D', 38D'' can further comprise a wiper portion 44A, 44A', 44A'' connected to a ramp portion 44B, 44B', 44B". The wiper portion 44A, 44A', 44A" can be shorter, in a view perpendicular to the insert base surface 34, than the connected ramp portion 44B, 44B', 44B". The wiper portion 44A, 44A', 44A" can be closer than the ramp portion 44B, 44B', 44B" than to adjacent first major corner edge portion 38B. The ramp portion 44B, 44B', 44B" can be closer than the wiper portion 44A, 44A', 44A" to the adjacent minor corner edge portion 38A, 38A', 38A".

In the mounted position shown in FIG. 1C, an operative cutting end 46 of the cutting insert 14 only comprises the first major corner edge portion 38B, the first major cutting edge portion 38C and the first minor cutting edge portion 38D. The cutting insert 14 can further comprise one or more, and in this example two, inoperative cutting ends 46', 46". Each inoperative cutting end 46', 46" can have an identical structure to the operative cutting end 46. Each of the so called inoperative cutting ends 46', 46" becomes respectively an operative cutting end, after the cutting insert 14 is indexed.

The insert anti-slip arrangement 40 can comprise first, second and third insert abutment surfaces 42A, 42B, 42C.

The same insert abutment surfaces 42A, 42B, 42C can be used for clamping the cutting insert 14, each time it is indexed.

A periphery 48 (FIG. 3B) of the cutting insert 14 can be considered to include not only the insert peripheral surface 36, but also the first, second and third insert abutment surfaces 42A, 42B, 42C, which are oriented transverse to the insert base surface 34.

Referring to FIG. 3B, using general designations for illustrative purposes, each insert abutment surface 42 can comprise a dovetail portion A1, forming an external and acute dovetail angle μ with the insert base surface 34, and a concave shaped portion A2 connected, and closer than the dovetail portion A1, to the insert base surface 34.

More specifically, referring to FIG. 3A and using the first insert abutment surface 42A as an example for each of the insert abutment surfaces 42A, 42B, 42C, which in this example have identical geometries: the first insert abutment surface 42A comprises a first dovetail portion 42A1 forming an external and acute first dovetail angle μ1 with the insert base surface 34, and a concave shaped first connection portion 42A2 connected, and closer than the first dovetail portion 42A1, to the insert base surface 34. The first insert dovetail portion 42A1 and the concave shaped first connection portion 42A2 together can be formed on a protuberance 50 extending from the insert base surface 34. The first insert dovetail portion 42A1 and the concave shaped first connection portion 42A2 together can form a protuberance abutment recess 52 on the protuberance 50.

The dovetail portions 42A1, 42B1, 42C1 can be connected by insert dovetail corners 42A3, 42B3, 42C3 (FIG. 3A) and can form a continuous shape.

In this non-limiting example, the connection portions 42A2, 42B2, 42C2 connect tangentially and directly to the dovetail portions 42A1, 42B1, 42C1. The curved connection portions provide structural strength to the cutting insert 14.

Each of the concave shaped connection portions 42A2, 42B2, 42C2 can have a radius $R_C$ (FIG. 3B) of at least 0.05 mm.

Drawing attention to FIG. 3C, the cutting insert 14 can comprise an insert dovetail plane $P_{ID}$ which extends perpendicular to the insert base surface 34 and extends between a center of first and second dovetail portions 42A1, 42B1. The first and second dovetail portions 42A1, 42B1 can be symmetric about the insert dovetail plane $P_{ID}$, which can also pass through the middle of the third dovetail portion 42C1.

Figure 8A:
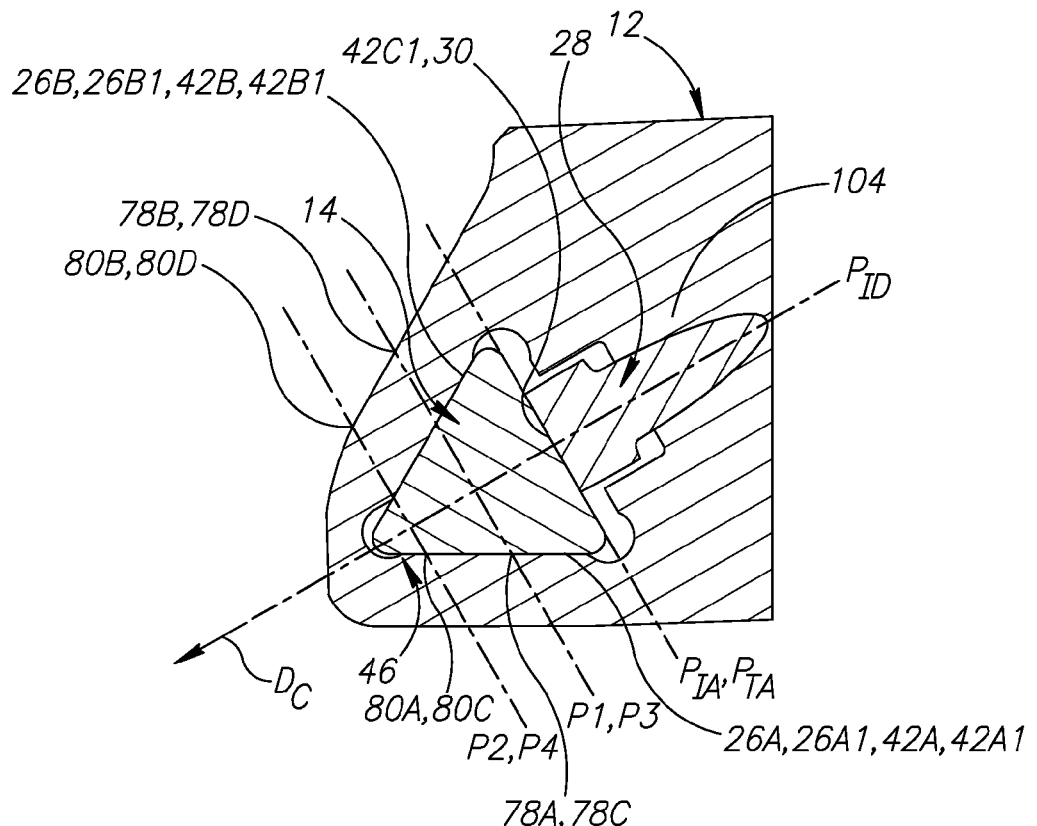
FIG. 8A is a sectional view taken along line 8A-8A in FIG. 1C, with the cutting insert clamped to the tool.

In the position shown in FIGS. 7A and 8A, with the operative cutting end being the cutting end designated by numeral 46, a portion of the third insert abutment surface 42C1 constitutes an insert actuator surface configured for abutting the tool actuator surface 30.

The cutting insert 14 in this example has 120° rotational symmetry around an insert central axis $A_{IC}$ (FIG. 3C) extending perpendicular to, and through the center of, the insert base surface 34.

In a view perpendicular to the insert base surface 34, a straight first insert dovetail portion 42A1 can be straight and adjacent to a straight first major cutting edge portion 38C.

The first insert dovetail portion 42A1 can have a first insert abutment length L1. The adjacent, and in this case parallel, first major cutting edge portion 38C can have a first cutting edge length L2. In this example L1 is 6.3 mm and L2 is 7.8 mm.

The first, second and third insert abutment surfaces 42A, 42B, 42C can face outward from the cutting insert 14 (exemplified by outwardly directed arrows designated 54A, 54B, 54C).

Notably, the third insert abutment surface 42C faces in a direction opposite to a location 56 where first and second insert abutment surfaces 42A, 42B converge.

In the view shown in FIG. 3C, the first and second insert abutment surfaces 42A, 42B are non-parallel. They can converge with increasing proximity to the first corner edge portion 38B. More precisely, using another perpendicular view, namely FIG. 8B, an internal cutting insert abutment angle $\gamma_{CA}$ between the first and second insert abutment surfaces (or more precisely between the dovetail portions 42A1, 42B1 thereof) or an identical internal tool abutment angle $\gamma_{TA}$, between the first and second tool abutment surfaces (or more precisely between the dovetail portions 26A1, 26B1 thereof), are shown to be less than 180° to each other, and are even shown to be acute. Each pair of abutment surfaces 26A, 26B and/or 42A, 42B can form a wedge-shaped arrangement.

Generally speaking, the plurality of insert abutment surfaces 42A, 42B, 42C can be formed on one or more protuberances. In the present example, the first, second and third insert abutment surfaces 42A, 42B, 42C are formed on a single protuberance 50 (FIG. 3B) which has a non-contacting lower protuberance surface 58. As shown, the insert abutment surfaces 42A, 42B, 42C can form all sides of, or enclose, the single protuberance 50.

Regardless of whether the insert anti-slip arrangement 40 is formed on a single protuberance 50, all abutment surfaces thereof 42A, 42B, 42C can be spaced apart from the insert peripheral surface 36 in a perpendicular view to the insert base surface 34. The size and dimensions of the insert base surface 34 can significantly affect machining performance of the cutting insert 14 and/or tool 12.

Before elaborating on the insert base surface 34 dimensions, it should be understood that even though, in the example shown, the first, second and third major cutting edge portions 38C, 38C', 38C" and the respective adjacent first, second and third dovetail portions 42A1, 42B1, 42C1 are all parallel and hence an angle between the respective portions is 0° (for example an angle between the first major cutting edge portion 38C and the first dovetail portion 42A1, is 0°).

A peripheral base edge 60 can extend along an intersection of the insert base surface 34 and the insert peripheral surface 36.

A maximum base width $W_{f1}$ is measurable between a furthest adjacent points 60A, 60B of the insert dovetail portions 42A1, 42B1, 42C1 to the peripheral base edge 60. The maximum base width $W_{f1}$ in this example is 2.9 mm. Furthest adjacent points 60A, 60B can be defined as connected by a longest segment $S_1$ perpendicular to a line $T_1$ passing though point 60A and tangent to the respective insert dovetail portion or dovetail corner.

A minimum base width $W_{f2}$ is measurable between closest adjacent points 60C, 60D of the insert dovetail portions 42A1, 42B1, 42C1 and the peripheral base edge 60. The minimum base width $W_{f2}$ in this example is 1.6 mm (i.e., having a magnitude of 55% of the maximum base width $W_{f1}$). Closest adjacent points 60C, 60D can be defined as connected by a shortest segment $S_2$ perpendicular to a line $T_2$ passing through point 60C and tangent to the respective insert dovetail portion or dovetail corner.

A first base width $W_{f3}$ is measurable between closest points 60E, 60F of the third dovetail portion 42C1 and an adjacent portion of the peripheral base edge 60. The first base width $W_{f3}$ can be defined as perpendicular to the third dovetail portion 42C1. It is noted that since, in this example the third dovetail portion 42C1 and adjacent portion of the peripheral base edge 60 are parallel, any two adjacent points would result in the same first base width $W_{f3}$. Similarly, due to the symmetrical design of the cutting insert 14, a similar first base width $W_{f3}$ would result using any of the other dovetail portions 42A1, 42B1. The first base width $W_{f3}$ in this example is 2.2 mm (i.e., having a magnitude of 76% of the maximum base width $W_{f1}$).

An inscribed dovetail circle C1 is shown inscribed to the insert dovetail portions 42A1, 42B1, 42C1, and has a dovetail radius R1. In this example the dovetail radius R1 is 2.5 mm.

An inscribed edge circle C2 is shown inscribed to the peripheral base edge 60, and has an edge radius R2. In this example the edge radius R2 is 4.6 mm (i.e. the dovetail radius R1 is 54% of the edge radius R2).

Referring to FIG. 3B, the cutting insert can be theoretically divided into a cutting portion 62A and a remainder portion 62B of the cutting insert.

The cutting portion 62A can be constituted by a portion of the cutting insert 14 enclosed by the insert peripheral surface 36.

The remainder portion 62B can, in this example, include an anti-slip arrangement portion 64A of the cutting insert 14 which comprises the anti-slip arrangement 40, and a tapering portion 64B. The dovetail portions 42A1, 42B1, 42C1 of the cutting insert 14 can be the widest portions of the remainder portion 62B. Stated differently, in the view of FIG. 3B, the dovetail portions 42A1, 42B1, 42C1 project outwardly more than any other part of the remainder portion 62B.

A cutting portion height H1 is measurable perpendicular to the insert base surface 34 and between the insert base surface 34 and an uppermost point, which in this example is the first corner edge portion 38B (or second or third corner edge portions 38B′, 38B″ which can each have an identical height).

An anti-slip arrangement height H2 ("remainder portion height") is measurable perpendicular to, and from, the insert base surface 34 in a direction away from the insert top surface 32 (i.e. in an insert downward direction $D_{ID}$) to a most distal lowermost point of the cutting insert 14, which in this example is the non-contacting lower protuberance surface 58.

A dovetail height H3 is measureable perpendicular to, and from, the insert base surface 34 in a direction away from the insert top surface 32 (i.e. in the insert downward direction $D_{ID}$) to a most distal point of the dovetail portions 42A1, 42B1, 42C1 of the cutting insert 14.

A tapering portion height H4 is measurable perpendicular to, and from, the most distal point of the dovetail portions 42A1, 42B1, 42C1 of the cutting insert 14 in a direction away from the insert top surface 32 (i.e. in the insert downward direction $D_{ID}$) to a most distal point of the tapering portion 64B, which in this example can be any point on the lower protuberance surface 58 as it is planar and all of the dovetail portions 42A1, 42B1, 42C1 have an identical position.

An insert total height H5 is, in this example, a sum of the cutting portion height H1, dovetail height H3 and tapering portion height H4. For a cutting insert without a tapering portion 64B, the insert total height H5 is a sum of the cutting portion height H1 and the dovetail height H3.

A center of gravity height H6 is measureable perpendicular to, and from, the insert base surface 34 in a direction towards the insert top surface 32 (i.e. in an upward direction $D_{IU}$ opposite to the insert downward direction $D_{ID}$) to a center of gravity CG of the cutting insert 14.

Exemplary height values can be approximately: H1=3.1 mm; H2=1.5 mm; H3=1.1 mm; H4=0.4 mm; H5=4.6 mm; and H6=0.79 mm.

Each of the dovetail portions 42A1, 42B1, 42C1, can be elongated. For example, the first dovetail portion 42A1, as shown in FIG. 3C, has the first insert abutment length L1 which can be seen to be far longer than the dovetail height H3, shown in FIG. 3B, noting that H3 is even greater in magnitude than an actual height of the first dovetail portion 42A1 since it includes the first connection portion 42A2).

Figure 8B:
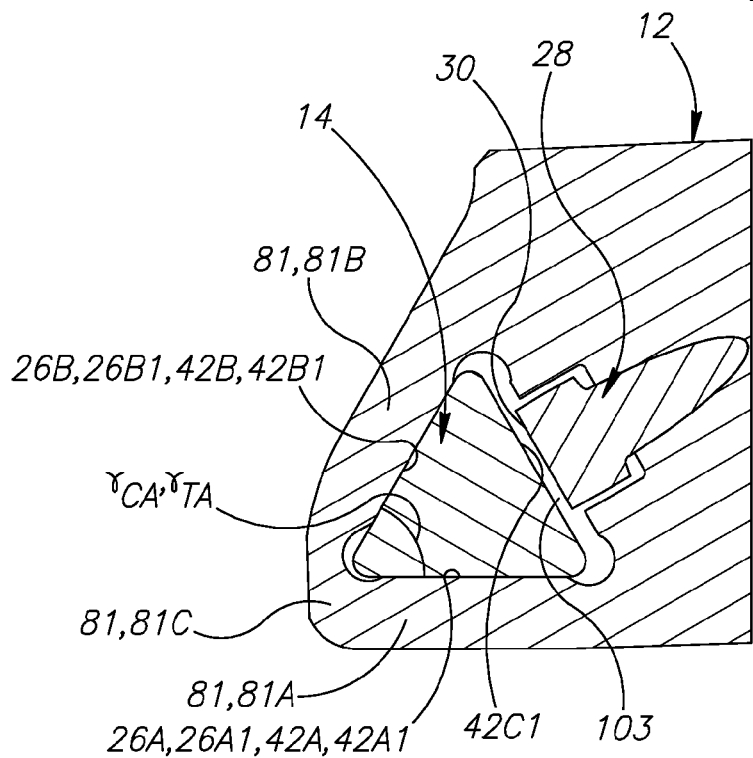
FIG. 8B is a similar sectional view as in FIG. 8A, with the clamp being spaced apart from the cutting insert.

The first and second tool abutment surfaces 26A, 26B (FIG. 2) are configured for engagement with the first and second insert abutment surfaces 42A, 42B (FIG. 3C). As shown in FIGS. 8A and 8B, the abutment surfaces 26A, 26B, 42A, 42B can have shapes corresponding to the abutment surface 26A, 26B, 42A, 42B intended to contact them (in this example, following straight lines in views perpendicular to respective base surfaces 18, 34, and also having similar lengths to a corresponding abutment surface).

Similarly, referring now to example FIGS. 7A, 7B and 7C, it will be understood that the first and second tool abutment surfaces 26A, 26B have dovetail portions corresponding to the first and second insert abutment surfaces 42A, 42B.

With reference only to the first tool abutment surface 26A, as the second tool abutment surface 26B has a corresponding construction, it is noted that the first tool abutment surface 26A comprises a first tool dovetail portion 26A1 forming an internal and acute first tool dovetail angle μ2 with the tool base surface 18, which is identical to the first dovetail angle μ1 (FIG. 3A). It will be understood that all dovetail angles μ of the tool 12 and cutting insert 14 can have identical values.

The first tool abutment surface 26A can also be chamfered or recessed 26A2, to be spaced apart from the first connection portion 42A2. This allows the first tool dovetail portion 26A1 to contact only the first insert dovetail portion 42A1 of the cutting insert 14, as shown in FIG. 7C. It has been found that a peripheral wall 75 associated with the tool peripheral surface 15B can bend outwardly during high-speed rotation.

Accordingly, the tool base surface 18 can be formed with an inner recessed portion 76 for increased stability of mounting of the cutting insert 14 under such conditions.

Even though not shown in this view, it will be understood that the only other contacting surfaces (apart from the first tool and insert dovetail portions 26A1, 42A1, and the tool and insert base surfaces 18, 34) are the abutting second tool and insert dovetail portions 26B1, 42B1, and the third tool dovetail portion 42C1 which abuts the tool actuator surface 30 (FIG. 7A). To avoid over-constraint of the cutting insert 14, all other surfaces thereof can be advantageously spaced from the tool 12. For example, a seating recess 77 (FIG. 2) of the seating region 16, within which the anti-slip arrangement 40 is located can have a concave shaped corner recess 77A, extending between the first tool dovetail portion 26A1 and a recess base surface 77B. It is further noted that the seating recess 77 is wider, in the view shown, than a portion of the cutting insert 14 therein. For reasons mentioned above, the insert peripheral surface 36 can be advantageously spaced from an adjacent tool wall 77C (FIG. 7A).

To clamp the cutting insert 14 to the tool 12, the cutting insert 14 is seated on the tool 12 in a position in which the insert base surface 34 contacts the tool base surface 18. Subsequently, the clamp's tool actuator surface 30 is biased against the third insert dovetail portion 42C1 resulting in the first and second insert abutment surfaces 42A, 42B being respectively biased against the first and second tool abutment surfaces 26A, 26B (or, more precisely, the dovetail portions are brought into contact).

A further advantage may be possibly achieved by biasing the tool actuator surface 30 in a cutting direction $D_C$ (FIGS. 2 and 8A). It will be understood that a tendency of the cutting insert 14 to slide or be moved out of a desired position, can be greatest at the operative first cutting end 46 thereof (FIG. 1C) when it is in contact with a workpiece (not shown). By securing the operative first cutting end 46 of the cutting insert 14, through applying clamping force outward from the tool 12, maintenance of a precise location of the cutting insert 14 or, more precisely, the operative first cutting end 46, is achievable.

The cutting direction $D_C$ can be defined as extending from the tool inner region 20 towards the tool peripheral region 22. In this example, the tool peripheral region extends along the cutting end 15A and the tool peripheral surface 15B adjacent thereto. More precisely, the cutting direction $D_C$ is directed to a location where first and second tool abutment surfaces 26A, 26B converge.

For a tool (not shown) configured to only machine in an axial direction, i.e., along the tool central axis $A_T$, the tool peripheral region 22 would be only along the cutting end 15A. For a tool (not shown) configured to only machine in a direction perpendicular to the tool central axis $A_T$, the tool peripheral region 22 would be only along the tool peripheral surface 15B. In this example, in which the tool is configured to machine in both an axial and radial direction, the cutting direction $D_C$ is directed toward an intersection of the cutting end 15A and the tool peripheral surface 15B.

More precisely, a cutting insert is normally mounted at a peripheral part of a tool, and protrudes therefrom to ensure that only the cutting insert, and not the tool contacts a workpiece (not shown). Therefore, the tool peripheral region 22 can be considered as comprising a peripheral edge 22A (FIG. 6) proximate to the protruding cutting edge 38B (FIG. 1A) of the cutting insert 14, when mounted to the tool 12.

Referring to FIG. 8A, it will be understood that there can be insert abutment surface planes, for example first and second insert abutment surface planes P1, P2, each of which are parallel to an insert actuator surface plane $P_{IA}$ which extends perpendicular to the insert base surface 34 and intersects the third insert dovetail portion 42C1. It is noted that the first insert abutment surface plane P1 is closer to the insert actuator surface plane $P_{IA}$ and that a pair of points 78A, 78B of the first and second insert abutment surfaces 42A, 42B which lie on the first insert abutment surface plane P1 are spaced apart from each other a greater magnitude of distance than a pair of points 80A, 80B which lie on the second insert abutment surface plane P2. Thus, the first and second insert abutment surfaces 42A, 42B converge with increasing proximity to the first cutting end 46.

The construction above also corresponds to that of the tool 12. A tool actuator surface plane $P_{TA}$ corresponds to the insert actuator surface plane $P_{IA}$; first and second tool abutment surface planes P3 and P4 correspond to first and second insert abutment surface planes P1, P2; points 78C, 78D correspond to points 78A, 78B; and points 80C, 80D correspond to points 80A, 80B). Similarly, tool abutment surfaces 26A, 26B converge with increasing proximity to the tool peripheral region 22.

The tool base surface 18 extends along the entire insert seating region 16 except for a portion completed by the clamp 28. Referring to FIG. 8B, the tool base surface 18 connects the first and second tool abutment surfaces 26A, 26B, i.e., providing a continuous wall 81 from the first abutment surface 26A to the second abutment surface 26B. The wall 81 comprising a first wall portion 81A adjacent the first abutment surface 26A, a second wall portion 81B adjacent the second abutment surface 26B and a corner wall portion 81C connecting the first and second wall portions 81A, 81B. Such connection can provide additional constructional strength against deflection of the first and second tool abutment surfaces 26A, 26B during a cutting operation (particularly notable at high speeds).

Referring to FIG. 6, the first wall portion 81A has less material thereunder than the second wall portion 81B which is closer to the tool central axis $A_T$. In such cases, it has been found that forming the first wall portion 81A to be larger than the second wall portion 81B can possibly provide advantageous constructional strength, especially in such cylindrical tools configured to rotate at high-speeds.

Such enlargement can be achieved by widening the first wall portion 81A. For example, a first tool base width $W_{T1}$ of the first wall portion 81A can be greater than a second tool base width $W_{T2}$ of the second wall portion 81B. The tool base widths $W_{T1}$, $W_{T2}$ are measured between the tool peripheral surface 15B, or axial surface 81E of the tool cutting end 15A, and a widest point (e.g., see point 81D in FIG. 7C) of the associated wall portion 81A, 81B.

Drawing attention to FIGS. 4A to 4D, the clamp 28 can comprise a cylindrical clamp shank portion 28A and a clamp head portion 28B connected thereto.

The clamp shank portion 28A can extend along a clamp axis $A_{CS}$, and can comprise a shank rear end 28A1 and a clamp front end 28A2, and a shank circumferential surface 28A3 extending therebetween.

The shank rear end 28A1 can comprise a clamp abutment surface 28A4 and a clamp recess 28A5 recessed into the clamp shank portion 28A from the clamp abutment surface 28A4 to the shank circumferential surface 28A3.

The clamp shank portion 28A can have a clamp shank width $W_{C1}$.

The clamp head portion 28B can be connected to clamp front end 28A2, and can have a clamp head width $W_{C2}$ be wider than the clamp shank portion 28A in a direction perpendicular to a clamp axis $A_{CS}$. More precisely the clamp head width $W_{C2}$ is parallel with a direction of elongation of the tool actuator surface 30. It will be understood that an elongated or increased length of a tool actuator surface 30, in a direction transverse, or in this example perpendicular, to a clamp axis $A_{CS}$ can increase stability when clamping the cutting insert 14.

The clamp head portion 28B can further provide first and second clamp relief surfaces 28B1, 28B2 which form an internal acute clamp angle with each other and which are connected to opposing sides of the tool actuator surface 30 in a side view (FIG. 4B).

The clamp head portion 28B can further be offset from the clamp shank portion 28A. To elaborate, the clamp head portion 28B can have a clamp uppermost surface 28B3 which is lower, in a side view, than an adjacent portion 28A6 of the shank circumferential surface 28A3, and a clamp lowermost surface 28B4 which is lower, in a side view, than an adjacent portion 28A7 of the shank circumferential surface 28A3. The clamp lowermost surface 28B4 is connected at one side to the clamp shank portion 28A by an inwardly extending clamp stopper surface 28B5 and at another side to the second clamp relief surface 28B2.

Drawing attention also to FIG. 7A, it is shown that when the clamp 28 is mounted to the tool 12, a portion of the clamp head portion 28B is located within a clamp recess 29 formed in the seating recess 77. The clamp recess 29 can comprise a clamp recess base surface 29A having a first clamp recess wall 29B adjacent a clamp hole 31, and an opposing second clamp recess wall 29C distal to the clamp hole 31.

When the cutting insert 14 is not mounted to the tool 12, the second clamp recess wall 29C can prevent the clamp 28 from falling from the tool 12 by contacting the second clamp relief surface 28B2. Similarly, for example when the screw 82 is not present, the clamp stopper surface 28B5 can abut the first clamp recess wall 29B and thereby prevent the clamp 28 from falling into the clamp hole 31. The offset of the clamp head portion 28B can allow the clamp 28 to be rotated and subsequently inserted or withdrawn from the clamp hole 31.

Figure 5A:
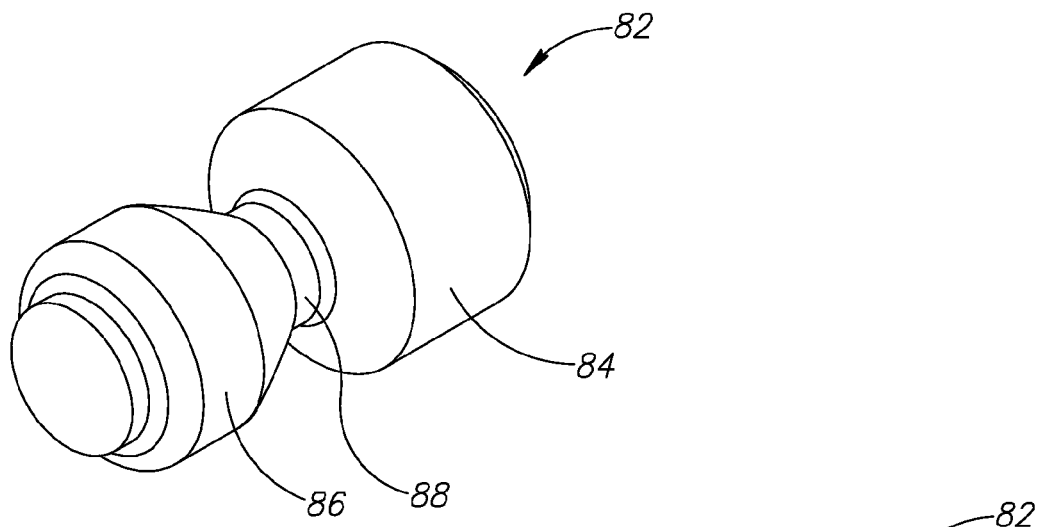
FIG. 5A is a perspective view of a screw of the tool assembly in FIGS. 1A to 1E.
Figure 5B:
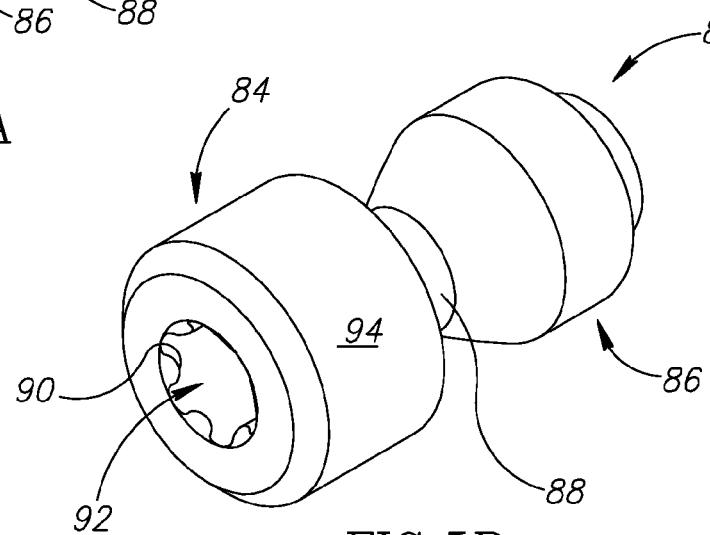
FIG. 5B is another perspective view of the clamp in FIG. 4A, shown from another end thereof.
Figure 5C:
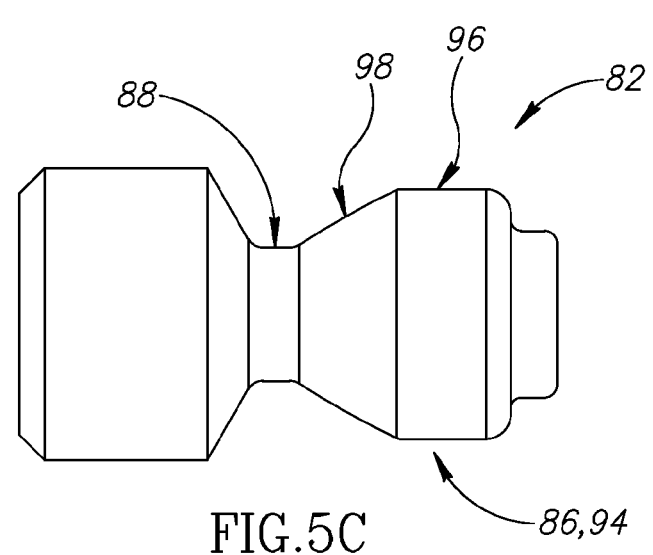
FIG. 5C is a side view of the clamp in FIGS. 4A and 4B.

Drawing attention to FIGS. 5A to 5C, the clamp 28 and/or screw 82 can be configured to abut each other to cause motion of the clamp 28.

The screw 82 can comprise a first screw end 84, a second screw end 86 and a cylindrical central portion 88 extending therebetween.

The first screw end 84 ("actuator portion"), can be formed with a tool receiving arrangement 90 (e.g. a torx arrangement) which can be located in a screw recess 92. The screw 82 also comprises external threading (not shown) which can preferably be located at a first screw outer peripheral surface 94.

The screw second end 86 ("enlarged portion") is relatively larger, i.e., in a radial direction, than the central portion 88. The screw second end 86 can further comprise a cylindrical portion 96 and a conical portion 98 which tapers to the central portion 88.

Upon close inspection of FIG. 5C, it can be noticed that the conical portion 98 can have a slight convex curvature in a side view thereof, allowing precision abutment contact with the clamp 28.

Figure 1E:
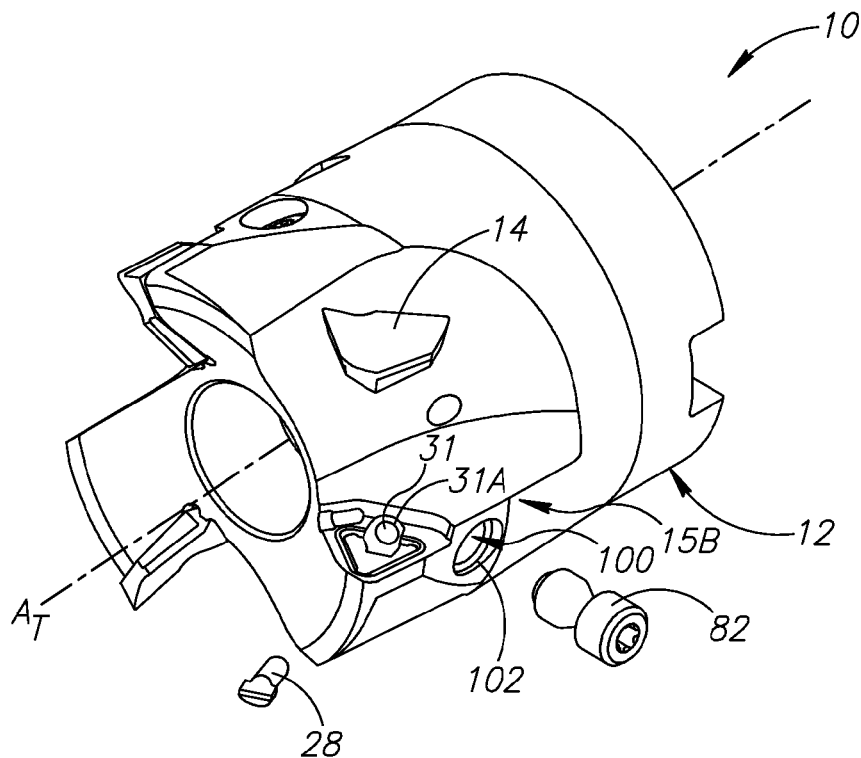
FIG. 1E is an exploded side perspective view of the tool assembly in FIGS. 1A to 1D.

Referring to FIG. 1E, assembling the tool assembly 10 is carried out by placing the screw 82 in a screw hole 100 and the clamp 28 in the clamp hole 31.

The screw hole 100 can open out a first end 102 to the tool peripheral surface 15B and extend therefrom into the tool inner region 20.

The clamp hole 31 can open out at a first end 31A to the seating recess and extend therefrom along a clamp hole axis $A_{CH}$ (FIG. 7B) into the tool inner region 20.

The clamp hole 31 and screw hole 100 can intersect each other.

When the screw 82 and the clamp 28 are mounted to the tool 12 the second screw end 86, or more precisely the conical portion 98 thereof, contacts the clamp abutment surface 28A4 (not shown).

Referring to FIGS. 7B and 8B, to mount the cutting insert 14, the clamp 28 is initially in the position shown and the cutting insert 14 can be mounted to the seating recess 77. Notably, there is a gap 103 between the cutting insert 14 and the clamp 28. The screw 82 is then rotated via a tool (not shown, e.g. a torx screw driver) engaging the tool receiving arrangement 90. Notably the screw 82 is rotated (for example in a clockwise direction) which moves the screw in a direction towards the tool peripheral surface 15B (and not in a direction into the tool 12). The screw's conical portion 98 pushes the clamp 28 via the clamp abutment surface 28A4 thereof to bring the tool assembly 10 into the clamping position shown in FIGS. 7A and 8A (i.e. with the tool actuator surface 30 and tool and insert dovetail surfaces contacting each other). It will be understood that when the tool 12 is rotated there can be a centrifugal force applied on the screw 82 (i.e. in an outward direction from the tool 12). Such force can possibly assist the screw 82 in applying a force on the clamp 28 to further apply a clamping force on the cutting insert 12.

To release the cutting insert 14, the screw can be rotated in an opposite direction.

Referring specifically to FIG. 7B, the tool actuator surface 30, when the clamp 28 is mounted to the tool 12, is slanted relative to the tool base surface 18 and can face at least partially in a tool downward direction $D_{TD}$ (the tool downward direction $D_{TD}$ being an opposite direction to a direction which the tool base surface 18 faces). When the clamp 28 moves along the clamp hole axis $A_{CH}$ a clamping force applied by the tool actuator surface 30 on the third insert dovetail portion 42C1 is directed in the slanted direction mentioned (i.e. in the downward direction $D_{TD}$) as well as in the cutting direction $D_C$ (i.e. in a slanted downward-outward direction).

Applying a clamping force in such direction can result in a destabilizing force in an opposite direction thereto (having at least an upward component in a direction opposite to the downward direction $D_{TD}$), which could destabilize the cutting insert 14 and/or the clamp 28. Without being bound to theory, it is believed that the clamp 28 being inside the tool (i.e. having material 104 of the tool thereabove) can provide the clamp 28 with sufficient stability to withstand the destabilizing force.

What is claimed is:

1. A cutting insert comprising
    opposing insert top and base surfaces which are connected by an insert peripheral surface, and
    an insert dovetail anti-slip arrangement adjacent to the insert base surface and comprising first, second and third insert abutment surfaces;
    the first insert abutment surface comprising
    a first insert dovetail portion forming an external and acute first insert dovetail angle with the insert base surface;
    the second insert abutment surface comprising
    a second insert dovetail portion forming an external and acute second insert dovetail angle with the insert base surface;

the third insert abutment surface comprising
a third insert dovetail portion forming an external and acute third insert dovetail angle with the insert base surface;
in a view perpendicular to the insert base surface, the first insert dovetail portion is non-parallel with the second insert dovetail portion; and
wherein a single protuberance projects from the insert base surface and all insert abutment surfaces of the cutting insert, other than the insert base surface, are formed on the protuberance.

2. The cutting insert according to claim 1, wherein:
a cutting edge is formed along an intersection of the insert top surface and the insert peripheral surface; and the cutting edge comprises first and second cutting edge portions extending from different sides of a corner edge portion.

3. The cutting insert according to claim 2, wherein, in a view perpendicular to the insert base surface the first cutting edge portion is straight, the same length as or longer than the second cutting edge portion, and forms with the first insert dovetail portion an angle of 30° or less.

4. The cutting insert according to claim 2, wherein, in a view perpendicular to the insert base surface, the first and second cutting edge portions are straight.

5. The cutting insert according to claim 1, wherein the first and second insert dovetail portions are elongated.

6. The cutting insert according to claim 1, wherein, in a view perpendicular to the insert base surface, all of the insert dovetail portions of the cutting insert are straight and are connected by insert dovetail corners, also forming an external and acute corner insert dovetail angle with the insert base surface, to form a continuous shape.

7. The cutting insert according to claim 1, wherein the cutting insert comprises major cutting edge portions which are equal in length and are the longest straight cutting edge portions in a view perpendicular to the insert base surface; in said view the cutting insert comprises an equal number of straight insert dovetail portions and major cutting edge portions.

8. The cutting insert according to claim 1, wherein, in a view perpendicular to the insert base surface, the cutting insert has rotational symmetry about an angle equal to 360° divided by a number of major cutting edge portions, around an insert central axis extending perpendicular to, and through the center of, the insert base surface; the major cutting edge portions being equal in length and are the longest straight cutting edge portions in a view perpendicular to the insert base surface.

9. The cutting insert according to claim 1, wherein, in a view perpendicular to the insert base surface, the first insert dovetail portion is straight and is adjacent to a straight major cutting edge portion; the first insert dovetail portion having a first insert dovetail length which has a magnitude of 63% to 83% of a first cutting edge length of the major cutting edge portion.

10. The cutting insert according to claim 1, wherein, in a view perpendicular to the insert base surface,
a peripheral base edge extends along an intersection of the insert base surface and the insert peripheral surface,
a first base width is defined perpendicular to the first insert dovetail portion and between the first insert dovetail portion and an adjacent portion of the peripheral base edge, and
a maximum base width is defined by a longest segment between a point along any of the insert dovetail portions or dovetail corners of the cutting insert and the adjacent peripheral base edge, where the longest segment is perpendicular to a tangent line passing through the selected point along the insert dovetail portion or dovetail corner; and
the first base width has a magnitude of 60% to 90% of the maximum base width.

11. The cutting insert according to claim 1, wherein, in a view perpendicular to the insert base surface,
a peripheral base edge extends along an intersection of the insert base surface and the insert peripheral surface,
a minimum base width is defined by a shortest segment between a point along any of the insert dovetail portions or dovetail corners of the cutting insert and the adjacent peripheral base edge, where the shortest segment is perpendicular to a tangent line passing through the selected point along the insert dovetail portion or dovetail corners; and
a maximum base width is defined by a longest segment between a point along any of the insert dovetail portions or dovetail corners of the cutting insert and the adjacent peripheral base edge, where the longest segment is perpendicular to a tangent line passing through the selected point along the insert dovetail portion or dovetail corner; and
the minimum base width has a magnitude of at least 50% of the maximum base width.

12. The cutting insert according to claim 1, wherein, in a view perpendicular to the insert base surface,
an inscribed dovetail circle, inscribed to insert dovetail portions of the anti-slip arrangement, has a dovetail radius R1;
an inscribed edge circle, inscribed to a peripheral base edge of the cutting insert, has an edge radius R2;
wherein the dovetail radius R1 has a magnitude of between 40% to 70% of the edge radius R2.

13. The cutting insert according to claim 1, wherein, in a view perpendicular to the insert base surface, the insert base surface completely surrounds the anti-slip arrangement.

14. The cutting insert according to claim 1, wherein, in a view perpendicular to the insert base surface, the third insert abutment surface faces in a direction opposite to a location where the first and second insert abutment surfaces converge.

15. The cutting insert according to claim 1, wherein the first, second and third insert dovetail angles form with the insert base surface an external angle of between 50° to 80°.

16. The cutting insert according to claim 1, wherein the cutting insert has a weight of between 2 to 6 grams.

17. The cutting insert according to claim 1, wherein the cutting insert comprises a cutting portion height measured perpendicular to the insert base surface and between the insert base surface and a point on the insert top surface most distal therefrom, and wherein a center of gravity of the cutting insert is located between 12% to 30% of the cutting portion height from the insert base surface.

18. The cutting insert according to claim 1, wherein:
a cutting portion height is measureable perpendicular to the insert base surface and between the insert base surface and an uppermost point on the insert top surface most distal therefrom;
an anti-slip arrangement height is measureable parallel with the cutting portion height, from the insert base surface in a direction away from the insert top surface to a most distal lowermost point of the cutting insert; and
the cutting portion height has a magnitude greater than that of the anti-slip arrangement height.

19. The cutting insert according to claim 1, wherein:
a cutting portion height is measureable perpendicular to the insert base surface and between the insert base surface and an uppermost point on the insert top surface most distal therefrom;
a dovetail height is measureable perpendicular to the insert base surface and from the insert base surface to a most distal lowermost point of the insert dovetail portion of the cutting insert; and
the dovetail height has a magnitude less than 70% of the cutting portion height.

20. The cutting insert according to claim 1, wherein the cutting insert is devoid of a through-hole.

21. The cutting insert according to claim 1, wherein each of the insert abutment surfaces further comprises a concave shaped connection portion connecting a respective one of the insert dovetail portions to the insert base surface.

22. The cutting insert according to claim 1, wherein the cutting insert is devoid of both:
a through hole having a diameter of 3 mm or greater, and
a non-circular hole having an equivalent volume.

23. A tool having a rotation axis defining a front-to-rear direction and comprising:
a tool cutting end;
a tool peripheral surface extending rearward from the tool cutting end;
an insert seating region adjacent to the tool cutting end; and
tool inner and peripheral regions located on opposing sides of the insert seating region;
the tool peripheral region extending along the tool cutting end and/or the tool peripheral surface;
the insert seating region comprising
a tool base surface,
a seating recess recessed into the tool from the tool base surface and at least partially surrounded thereby, and
first and second tool abutment surfaces;
the first tool abutment surface comprising
a first tool dovetail portion forming an internal and acute first tool dovetail angle with the tool base surface; and
the second tool abutment surface comprising
a second tool dovetail portion forming an internal and acute second tool dovetail angle with the tool base surface;
in a view perpendicular to the tool base surface, the first tool dovetail portion is non-parallel with the second tool dovetail portion; and
the tool is further formed with a clamp hole opening out at a first end thereof to the seating recess and extending therefrom towards an interior of the tool.

24. A tool assembly comprising:
a cutting insert according to claim 1;
a tool according to claim 23; and
a clamp positioned within the clamp hole;
wherein the cutting insert is mounted to the insert seating region of the tool with only:
the first insert abutment surface abutting the first tool abutment surface;
the second insert abutment surface abutting the second tool abutment surface;
the clamp abutting the third insert abutment surface; and
the insert base surface abutting the tool base surface.

* * * * *